(12) United States Patent
Tang et al.

(10) Patent No.: US 11,458,784 B2
(45) Date of Patent: Oct. 4, 2022

(54) METHODS AND APPARATUS TO DETERMINE TIRE TREAD DEPTH

(71) Applicant: Ford Global Technologies, LLC, Dearborn, MI (US)

(72) Inventors: Xun Tang, Dearborn, MI (US); Pankaj Kumar, Canton, MI (US); Hassene Jammoussi, Canton, MI (US); Steven J. Szwabowski, Northville, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 16/829,867

(22) Filed: Mar. 25, 2020

(65) Prior Publication Data

US 2021/0300133 A1 Sep. 30, 2021

(51) Int. Cl.
*B60C 25/00* (2006.01)
*G01P 15/18* (2013.01)
*B60C 25/05* (2006.01)
*B60C 19/00* (2006.01)

(52) U.S. Cl.
CPC ............ *B60C 25/007* (2013.01); *B60C 19/00* (2013.01); *B60C 25/056* (2013.01); *G01P 15/18* (2013.01); *B60C 2019/004* (2013.01)

(58) Field of Classification Search
None
See application file for complete search history.

(56) References Cited

U.S. PATENT DOCUMENTS

| 9,050,864 | B2 | 6/2015 | Singh et al. | |
| 9,443,358 | B2 | 9/2016 | Breed | |
| 10,245,906 | B2 | 4/2019 | Singh et al. | |
| 2014/0366618 | A1* | 12/2014 | Singh | B60C 23/04 73/146.3 |
| 2015/0040656 | A1* | 2/2015 | Singh | B60C 11/246 73/146.5 |
| 2017/0166019 | A1* | 6/2017 | Singh | G01N 19/00 |
| 2018/0003593 | A1 | 1/2018 | Siegel et al. | |
| 2018/0154707 | A1* | 6/2018 | Singh | B60C 23/04 |

FOREIGN PATENT DOCUMENTS

WO 2017142536 8/2017

* cited by examiner

*Primary Examiner* — Peter J Macchiarolo
*Assistant Examiner* — Jermaine L Jenkins
(74) *Attorney, Agent, or Firm* — Gregory Brown; Hanley Flight & Zimmerman LLC

(57) ABSTRACT

Methods, Apparatus, and Articles of Manufacture are disclosed for determining a tread depth status of a tire of a vehicle, including an accelerometer interface to access acceleration data from an accelerometer associated with the tire, the acceleration data including first acceleration data indicative of acceleration in a first direction, second acceleration data indicative of acceleration in a second direction, and third acceleration data indicative of acceleration in a third direction, and a data segmenter to segment the first acceleration data into a first data segment, the second acceleration data into a second data segment, and the third acceleration data into a third data segment based on at least one of an acceleration cycle or a common time interval.

20 Claims, 13 Drawing Sheets

METHODS AND APPARATUS TO DETERMINE TIRE TREAD DEPTH

FIELD OF THE DISCLOSURE

This disclosure relates generally to vehicle tires and, more particularly, to methods and apparatus to determine tire tread depth.

BACKGROUND

Motor vehicles such as automobiles, cars, and trucks include tires fixed on wheels of the vehicles to facilitate traction of the vehicle on a surface. Motor vehicle tires are designed to operate in adverse weather conditions such as snow and/or rain. As such, treads are disposed on the tires to reduce hydroplaning. Motor vehicle tires are often made of relatively soft materials. Thus, the treads of a tire wear down over time and the tread depth of the tire decreases over time.

Figure 1:
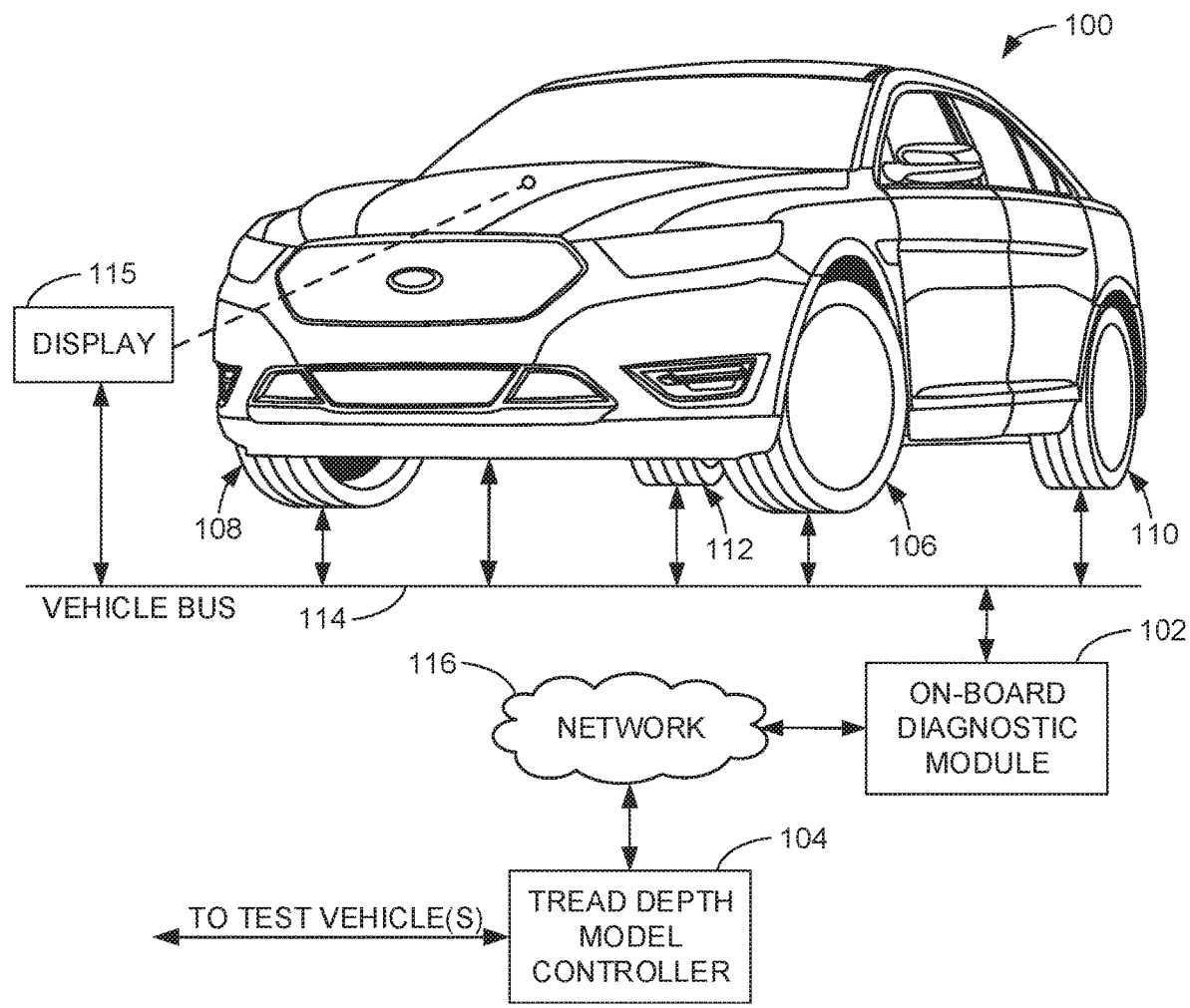
FIG. 1 is an example system diagram including an example vehicle, an example on-board diagnostic module, and an example tread depth model controller that can be implemented in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

SUMMARY

An example apparatus for determining a tread depth status of a tire of a vehicle includes an accelerometer interface to access acceleration data from an accelerometer associated with the tire, the acceleration data including first acceleration data indicative of acceleration in a first direction, second acceleration data indicative of acceleration in a second direction, and third acceleration data indicative of acceleration in a third direction. The apparatus includes a data segmenter to segment the first acceleration data into a first data segment, the second acceleration data into a second data segment, and the third acceleration data into a third data segment based on at least one of an acceleration cycle or a common time interval. The apparatus includes a power spectrum generator to generate a first power spectrum density associated with the first data segment, a second power spectrum density associated with the second data segment, and a third power spectrum density associated with the third data segment. The apparatus includes a data augmenter to augment the first, second, and third power spectrum densities into a fourth power spectrum density. The apparatus includes a status controller to determine the tread depth status based on the fourth power spectrum density.

An example method for determining a tread depth status of a tire of a vehicle includes accessing acceleration data from an accelerometer associated with the tire, the acceleration data including first acceleration data indicative of acceleration in a first direction, second acceleration data indicative of acceleration in a second direction, and third acceleration data indicative of acceleration in a third direction. The method includes segmenting the first acceleration data into a first data segment, the second acceleration data into a second data segment, and the third acceleration data into a third data segment based on at least one of an acceleration cycle or a common time interval. The method includes generating a first statistic associated with the first data segment, a second statistic associated with the second data segment, and a third statistic value associated with the third data segment. The method includes augmenting the first statistic, second statistic, and third statistic into a fourth statistic. The method includes determining the tread depth status based on the fourth statistic.

An example electronic control unit (ECU) for determining a tread depth of a tire of a vehicle includes an input interface to access acceleration data from an accelerometer associated with the tire, the acceleration data including first acceleration data indicative of acceleration in a first direction, second acceleration data indicative of acceleration in a second direction, and third acceleration data indicative of acceleration data in a third direction. The ECU includes a data segmenter to segment at least the first acceleration data into a first data segment, the second acceleration data into a second data segment, and the third acceleration data into a third data segment based on at least one of an acceleration cycle or a common time interval. The ECU includes a power spectrum generator to generate a first power spectrum density associated with the first data segment, a second power spectrum density associated with the second data segment, and a third power spectrum density associated with the third data segment. The ECU includes a data augmenter to augment the first, second, and third power spectrum densities into a fourth power spectrum density. The ECU includes a status controller to determine the tread depth based on the fourth power spectrum density.

DETAILED DESCRIPTION

Motor vehicles such as automobiles, cars, and trucks include tires circumferentially surrounding wheel rims of the vehicles. Tires provide traction between a vehicle's powertrain components (e.g., engine, wheels, axles, etc.) and a surface upon which the vehicle is being driven (e.g., a road). In particular, tires are inflated with pneumatic pressure and are in a force-transmitting connection with respective wheels of the vehicle. Tires can be composed of natural and/or synthetic materials such as natural rubber, synthetic rubber, carbon, and steel to provide for high friction (e.g., a high coefficient of static and/or dynamic friction) between the tires and the road surface. Typically, tires are relatively soft to facilitate this high friction and, thus, wear radially inward (i.e., wear down) over time relative to a central axis of the tire.

Vehicle tires such as all-season tires, summer tires, highway tires, winter tires, etc., are designed to operate in a variety of weather conditions. Weather conditions such as rain and/or snow, etc., can cause a layer of water to accumulate on surfaces such as roads. The interface of rolling vehicle tires and a surface in these conditions can result in a portion of the depth of the layer of water flowing between contact areas of the tires and the surface.

Vehicle tires include treads (e.g., radially inward grooves relative to the central axis of the tire) disposed about the tires to divert the layer of water from the contact areas of the tires and the road surface. The treads can include patterns of grooves extending circumferentially, axially, and at angles therebetween relative to the central axis of the tire. As the tires wear down with use, a tread depth (e.g., a depth of the radially inward grooves in the tires) decreases as the radially outer surface of the tires wear radially inward. The tread depth is a primary metric for replacing and/or rotating vehicle tires. For example, when the tread depth of a tire is below a threshold, the tire should be considered for being replaced for optimum performance.

Tire tread depth can be inspected manually by, for example, inspecting wear indicator bars etched on the tire by the tire's manufacturer, pressing monetary coins such as a United States quarter dollar coin (e.g., a Quarter) into a tread, and/or using a dedicated tread depth gauge, etc. However, these methods of inspection are often applied only infrequently to a vehicle. Accordingly, it is beneficial for a vehicle operator to be aware that the tread depths of one or more tires of their vehicle is near or below the threshold tread depth (e.g., an "unacceptable" tread depth status), or if the tires of the vehicle are in good condition well enough above the threshold tread depth (e.g., an "acceptable" tread depth status). It can be beneficial for a passenger (e.g., an owner, etc.) of an autonomous vehicle to be aware that tread depths of one or more tires of their vehicle is near or below the threshold tread depth and needs replacement.

Examples disclosed herein automatically determine (e.g., predict) a tread depth status and/or a tread depth of one or more tires of a vehicle tire. A tread depth model controller can generate (e.g., train) a tread depth status model to determine and/or predict a tread depth status of a vehicle tire in a training phase. The tread depth model controller can conduct a plurality of tests using one or more tires of test vehicles to collect, access, and/or process training data to train the tread depth status model in the training phase.

In some disclosed examples, in the training phase, an accelerometer is fixed to an inner face (e.g., an internal face) of a tire of a test vehicle opposite the treads to record acceleration data (e.g., acceleration signal(s), accelerometer data, etc.) during operation of the vehicle (e.g., rotation of the tires). The accelerometer can record acceleration data in the X, Y, and Z directions. The tread depth model controller can process the acceleration data. For example, for each test of the plurality of tests, the tread depth model controller can segment the X, Y, and Z acceleration data into respective acceleration data segments. The tread depth model controller can generate a power spectrum density, also known as the power spectral density, (e.g., a statistic) for each of the X, Y, and Z acceleration data segments. As used herein, a power spectrum density is a vector representative of the distribution of power according to the frequencies of the data. For example, each element of the vector can include the power of a frequency range. The tread depth model controller can augment the X, Y, and Z power spectrum densities into an augmented power spectrum density (e.g., an augmented power spectrum density matrix and/or vector, a single power spectrum density matrix and/or vector, etc.) for each test of the plurality of tests. In other examples disclosed herein, another statistic such as energy spectral density can be used in place of power spectrum density.

In some disclosed examples, in the training phase, the tread depth model controller can access a measured tread depth (e.g., a measured tread depth determined by manual inspection with a tread depth gauge) and can determine an accompanying measured tread depth status (e.g., "acceptable" or "unacceptable") for each test. The tread depth controller can generate (e.g., train) a tread depth status model based on the measured tread depth and/or measured tread depth status for each test and the respective augmented power spectrum density (e.g., the augmented power spectrum density matrix and/or vector) for each test. In some examples, the tread depth status is the target variable (e.g., the classification, the dependent variable, etc.) of the tread depth status model. In some examples, the tread depth model controller can consider available additional data (e.g., vehicle and tire make, model, tread depth history, vehicle load, vehicle speed, tire pressure, temperature etc.) for each test. In some examples, the tread depth status model can be a tread depth model, and the tread depth model controller can generate a tread depth model to predict a numerical tread depth of one or more tires of the vehicle additionally or alternatively to a tread depth status.

In some disclosed examples, the tread depth model controller can use a supervised Artificial Intelligence (AI) and/or Machine Learning (ML) model such as a Support Vector Machine (SVM), a Neural Network (NN), or a Random Forest (RF) to generate (e.g., train) the tread depth status model. For example, the tread depth mode controller can provide (e.g., deploy) the generated tread depth status model to an on-board diagnostic module of a vehicle (e.g., an Electronic Control Unit (ECU)) to determine (e.g., predict) the tread depth status of the vehicle during operation of the vehicle in an operation phase of the tread depth status model.

In some disclosed examples, in the operation phase, like in the training phase, an accelerometer is fixed to an inner face of a tire of the vehicle opposite the treads to record acceleration data during operation of the vehicle. The accelerometer can record acceleration data in the X, Y, and Z directions. The on-board diagnostic module can process the acceleration data. For example, the on-board diagnostic module can segment the X, Y, and Z acceleration data into respective acceleration data segments. The on-board diagnostic module can generate a power spectrum density, also known as the power spectral density, (e.g., a statistic) for each of the X, Y, and Z acceleration data segments. The on-board diagnostic module can augment the X, Y, and Z power spectrum densities into an augmented power spectrum density (e.g., an augmented power spectrum density matrix and/or vector, a single power spectrum density matrix and/or vector, etc.).

In some disclosed examples, in the operation phase, the on-board diagnostic module can predict a tread depth status (e.g., "acceptable" or "unacceptable") of one or more tires of the vehicle based on the augmented power spectrum density. In some examples, the on-board diagnostic module can consider available additional data (e.g., vehicle and tire make, model, tread depth history, vehicle load, vehicle speed, tire pressure, temperature etc.). In some examples, the on-board diagnostic module can predict the tread depth (e.g., the numerical tread depth) of the vehicle with a tread depth model.

In some disclosed examples, the on-board diagnostic module can transmit the determined tread depth status to a display of the vehicle. The on-board diagnostic module can transmit the tread depth status determinations, the underlying acceleration data, and/or intermediate determinations to the tread depth model controller to regenerate (e.g., re-train) the tread depth status model. Advantageously, examples disclosed herein do not require manual and/or visual inspection of one or more tires of a vehicle to determine and/or predict the tread depth status of the vehicle. However, in some examples, the tread depth of the vehicles is measured, and the measured tread depth is transmitted to the tread depth model controller to contribute to the regeneration (e.g., retraining) of the tread depth status model.

In some disclosed examples, the tread depth model can be a regression model to make a numerical prediction of the tread depth based on the augmented power spectrum density. In these examples, the on-board diagnostic module can provide the predicted tread depth and/or the tread depth status associated with the predicted tread depth of one or more tires to the display of the vehicle.

Now turning to the figures. FIG. 1 is an example system diagram including an example vehicle 100, an example on-board diagnostic module 102 to execute a training phase to generate a tread depth status model, and an example tread depth model controller 104 to execute the operation phase of the tread depth status model that can be implemented in accordance with the teachings of this disclosure. In the illustrated example of FIG. 1, the vehicle 100 includes an example Front Left (FL) tire 106 and Front Right (FR) tire 108 positioned on front wheels of a front axle of the vehicle 100. The vehicle 100 also includes an example Rear Left (RL) tire 110 and Rear Right (RR) tire 112 positioned on rear wheels of a rear axle of the vehicle 100. In other examples, the vehicle 100 can have any other number of tires (e.g., a vehicle with two wheels having two tires on the front axle and four wheels having four tires on the rear axle, a vehicle with three or more axles, etc.).

In the examples disclosed herein, the term "radial" refers to the direction perpendicular to a central axis of a tire (e.g., one of the tires 106-112). The terms "radially inward" and/or "radially inner", etc., refer to a radial position relatively closer to the central axis of the tire, and the terms "radially outward" and/or "radially outer", etc., refer to a radial position relatively farther from the central axis of the tire. The term "axial" refers to the direction parallel to the central axis of the tire and/or an axle of a vehicle. The terms "axially inward" and/or "axially inner", etc., refer to an axial position relatively closer to the center of the vehicle, and the terms "axially outward" and/or "axially outer", etc., refer to an axial position relatively farther away from the center of the vehicle. The term "circumferential" refers to a direction along the circumference of the tire.

In the illustrated example of FIG. 1, the on-board diagnostic module 102 is implemented by an ECU of the vehicle 100. For example, the on-board diagnostic module 102 can be implemented by a Body Control Module (BCM). In FIG. 1, the on-board diagnostic module 102 is communicatively coupled to aspects and/or components of the vehicle 100 via an example vehicle bus 114. In FIG. 1, the vehicle bus 114 can be implemented by one or more wired or wireless connections and/or communications networks. For example, the vehicle bus 114 can be implemented by a Controller Area Network (CAN) bus and/or one or more Radio Frequency (RF) modules to communicate with one or more wireless accelerometers (e.g., via a Bluetooth® interface, via a near field communication (NFC) interface, etc.) positioned inside one or more of the tires 106-112.

In the illustrated example of FIG. 1, the on-board diagnostic module 102 can access acceleration data (e.g., accelerometer data) from accelerometers positioned inside one or more of the tires 106-112. For example, the on-board diagnostic module 102 can process the acceleration data and can apply the tread depth status model generated by the tread depth model controller 104 to determine the tread depth status of one or more of the tires 106-112 of the vehicle 100. The on-board diagnostic module 102 can provide a tread depth of the one or more of the tires 106-112 to an example vehicle display 115 (e.g., a display 115) of the vehicle 100 via the vehicle bus 114. For example, the display 115 can be an infotainment system, a dashboard warning light, or any other suitable display 115 of the vehicle 100.

In the illustrated example of FIG. 1, the on-board diagnostic module 102 is communicatively coupled to the tread depth model controller 104 via an example network 116. In FIG. 1, the tread depth model controller 104 is communicatively coupled to one or more test vehicles. For example, the tread depth model controller 104 can collect and/or access acceleration data, measured tread depth values, and/or additional data from one or more tires of each of the one or more test vehicles. The tread depth model controller 104 can generate (e.g., train) the tread depth status model based on the training data for the one or more test vehicles. For example, the tread depth model controller 104 can be communicatively coupled to the one or more test vehicles via one or more vehicle busses (e.g., analogs of the vehicle bus 114 of the vehicle 100) via any other suitable wired connection, wireless connection, and/or communications network to gather the training data.

In some examples, the tread depth model controller 104 can access, via the network 116, acceleration data, tread depth statuses, and/or measured tread depth values, collectively referred to as operation data, concerning the tires 106-112 and/or the vehicle 100. The tread depth model controller 104 can regenerate (e.g., re-train) the tread depth status model based on the operation data for one or more vehicles. In some examples, the tread depth model controller 104 can transmit updated and/or improved tread depth status models to the on-board diagnostic module 102 via the network 116. In FIG. 1, the tread depth status model can be preloaded (e.g., deployed) on the on-board diagnostic module 102 and/or updated (e.g., replaced with an improved tread depth status model) at any suitable frequency.

Figure 2:
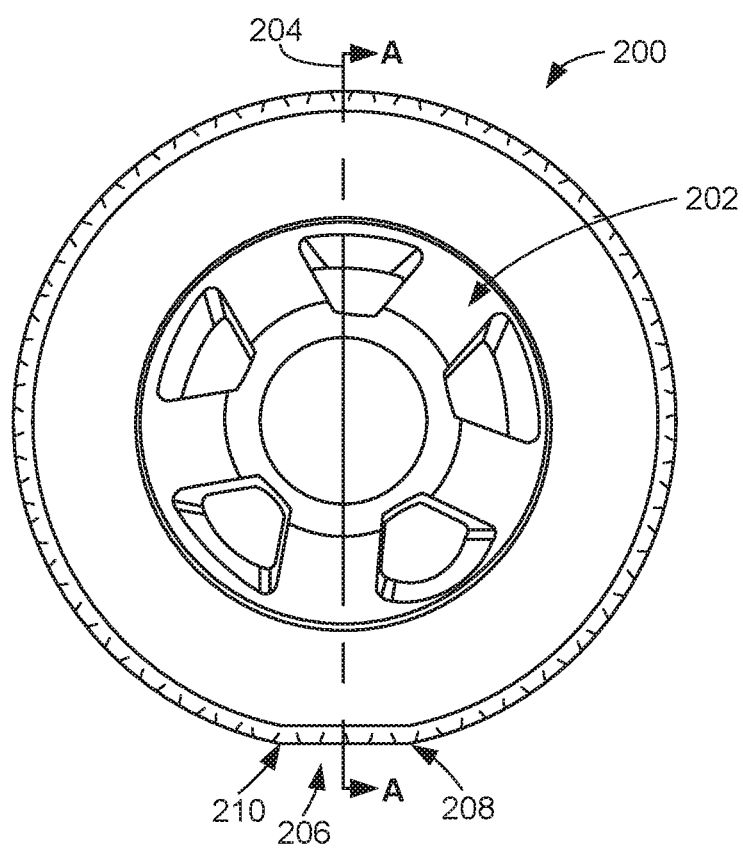
FIG. 2 is an example wheel and an example tire including an example A-A section line.

FIG. 2 is an example tire 200 of an example wheel 202 including an example A-A section line 204. The tire 200 is representative of any of the tires 106-112 of the vehicle 100 (both of FIG. 1) and is representative of any of the tires of the one or more test vehicles communicatively coupled to the tread depth model controller 104 (FIG. 1). For convenience, the tire 200 is discussed in connection with the vehicle 100. In the view of FIG. 2, the tire 200 includes an example contact area 206 at the interface of the tire 200 and a surface upon which the vehicle 100 is being driven. In this example, the contact area 206 is the portion of the tire 200 that is at the interface of the tire 200 and the surface upon which the vehicle 100 is being driven.

In the example of FIG. 2, the contact area 206 is flattened to illustrate a deformation that occurs in the tire 200 when the vehicle 100 rests upon the tire 200. The flattening of the contact area 206 may be overemphasized in order to show the deformation. For example, when the tire 200 is rolling clockwise in the orientation of FIG. 2, the tire 200 includes a first deflection point 208, wherein the tire 200 begins to deform (e.g., deflect and/or flatten). Similarly, when the tire 200 is rolling clockwise, the tire 200 includes a second deflection point 210, wherein the tire 200 moves from a flattened and/or deformed state back to its undeformed and/or original state. This deformation and subsequent release occur during each rotation of the tire 200. In some examples, the first deflection point 208 and the second deflection point 210 can be switched based on the direction of revolution of the tire 200.

Figure 3:
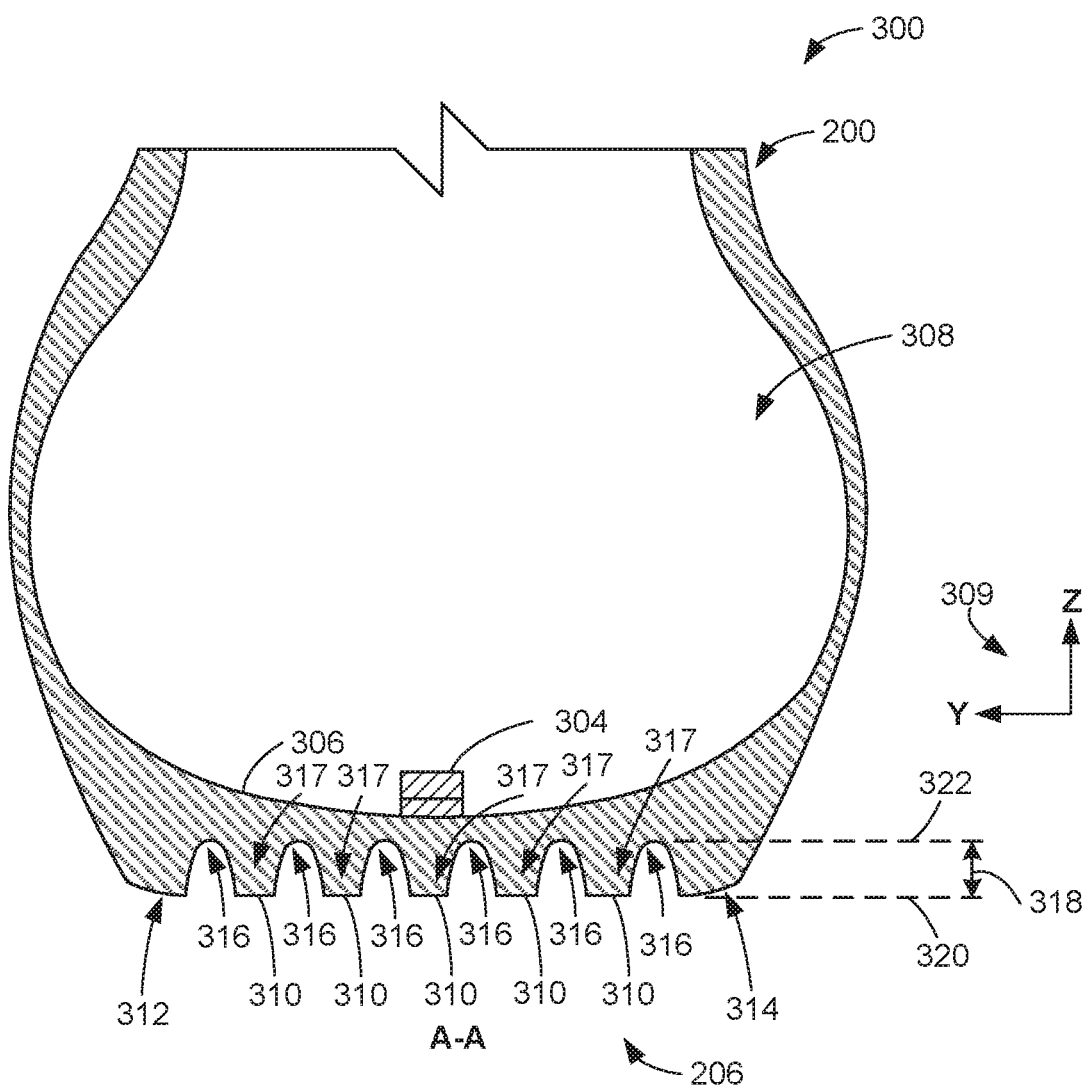
FIG. 3 is a cross-section of the example tire of FIG. 2 including an example accelerometer taken at the A-A section line of FIG. 2.

FIG. 3 is a cross-section 300 of the example tire 200 of FIG. 2 taken along the A-A section line 204 of FIG. 2. In this example, the tire 200 is in the deformed state and the outer face of the tire 200 is part of the contact area 206. In FIG. 3, the cross-section 300 is shows the tire 200 having a homogenous composition depicted by uniform cross-hatching. However, in other examples in accordance with the teachings of this disclosure, the tire 200 can include natural and/or synthetic body plies, cap plies, belts, belt covers, beads, etc., along with geometric variations such as one or more recesses, cavities, etc., not shown in FIG. 3.

In the illustrated example of FIG. 3, an example accelerometer 304 is fixed to an example radially inner surface 306 of the tire 200 at or near the axial center of the tire 200. Accordingly, during operation of the vehicle 100, the accelerometer 304 rotates about the central axis of the tire 200. In this example, the accelerometer 304 is within an internal pressurized cavity 308 of the tire 200. For example, the accelerometer 304 can be a stand-alone accelerometer or integrated as part of a larger Inertial Measurement Unit (IMU). In the view of FIG. 3 (e.g., the cross-section 300), the accelerometer 304 is cut in half. Accordingly, in the example of FIG. 3, the tire 200 is in a position such that the accelerometer 304 is in its vertically lowest position (e.g., below the central axis of the tire 200).

In the illustrated example of FIG. 3, the accelerometer 304 can record acceleration in the X, Y, and Z directions (e.g., axes) corresponding to a coordinate system 309 (e.g., a preprogrammed coordinate system 309 on the accelerometer 304). In FIG. 3, the coordinate system 309 can be in oriented in any suitable direction, for example, to ease mounting of the accelerometer 304 to the radially inner surface 306 of the tire 200. For example, in FIG. 3, the Z direction is oriented vertically on the page, the Y direction is oriented horizontally on the page, and the X direction is oriented into and out of the page according to an example coordinate system 309.

In FIG. 3, the example tire 200 includes example radially outer surfaces 310 and example axially inner and outer shoulders 312, 314, collectively including the contact area 206 (FIG. 2) of the tire 200 with a surface upon which the vehicle 100 is being driven. Further, the tire 200 includes example tread grooves 316 defining tread ribs 317 therebetween. When the tire 200 is exposed to adverse weather conditions such as rain and/or snow, water can be deflected away from the radially outer surfaces 310 into the tread grooves 316, increasing the traction of the tire 200. Though the tread grooves 316 are shown as circumferential grooves in the example of FIG. 3, the tread grooves 316 additionally or alternatively can be axial grooves, and/or grooves of any other angle between circumferential and axial on the radially outer surfaces 310 and/or the shoulders 312, 314. Further, the tread grooves 316 need not trace the circumference of the tire 200. For example, the tread grooves 316 can trace any portion of the radially outer surfaces 310, the shoulders 312, 314, etc.

In the example of FIG. 3, an example tread depth 318 (e.g., a radial tread depth 318) of the tire 200 is indicated as the distance between an example radially outer dashed line 320 and an example radially inner dashed line 322. In FIG. 3, the radially outer dashed line 320 is aligned with one or more of the radially outer surfaces 310 and the radially inner dashed line 322 is aligned with the radially inner depth of the tread grooves 316. Thus, the tread depth 318 is the distance between the radially outer surfaces 310 and the radially inner depth of the tread grooves 316. However, in other examples in accordance with the teachings of this disclosure, the tread depth 318 can be any suitable depth and/or distance to indicate the wear of the tread ribs 317 and/or the shoulders 312, 314 of the tire 200.

The tread depth 318 can be a measured tread depth 318 when the value of the tread depth 318 is measured by, for example, a tread depth gauge. The tread depth 318 can also be a predicted tread depth 318, when the value of the tread depth 318 is predicted using, for example, a tread depth model.

During the rotation of the tire 200 (e.g., clockwise rotation) the accelerometer 304 will experience a first deflection when the tire 200 rotates such that the circumferential location on the tire 200 where the accelerometer 304 is fixed encounters the first deflection point 208 (FIG. 2). The accelerometer 304 will then experience a second deflection when the tire 200 rotates such that the circumferential point encounters the second deflection point 210 (FIG. 2). In the example of FIG. 3, the accelerometer 304 is configured to record accelerations at the deflections of the accelerometer 304, and to normalize and/or ignore acceleration components that occur in the tire 200 due to rotation of the tire 200. For example, the tread depth 318 can affect the acceleration data of the deflection, enabling a correlation between the acceleration data and the tread depth 318. For example, the acceleration caused by the material deformation of the tire 200 (e.g., deformation of the natural and/or synthetic materials) and/or deflection of the tire 200 can change as the tread depth 318 of the tire 200 changes (e.g., decreases).

Figure 4:
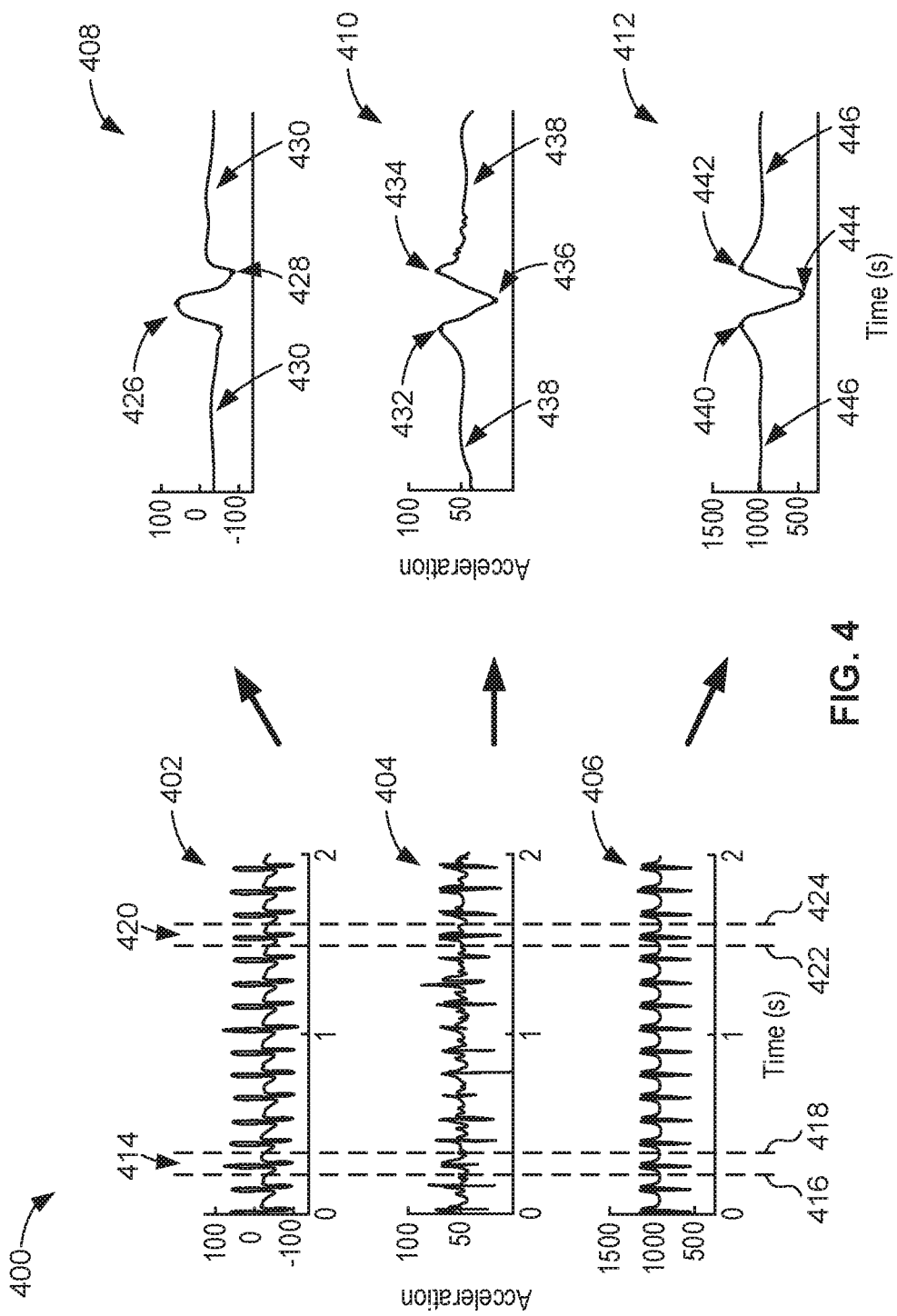
FIG. 4 is a diagram of example X, Y, and Z direction acceleration data and corresponding first example X, Y, and Z direction acceleration data segments segmented based on acceleration cycles.

FIG. 4 includes example first acceleration plots 400 depicting example X direction acceleration data 402, example Y direction acceleration data 404, and example Z direction acceleration data 406 according to the convention of FIG. 3 (e.g., the coordinate system 309). FIG. 4 also includes a corresponding example first X direction acceleration data segment 408, example first Y direction acceleration data segment 410, and example first Z direction acceleration data segment 412 segmented based on acceleration cycles. The X, Y, and Z direction acceleration data 402, 404, 406 are also referred to as acceleration data 402, 404, 406 herein. The first X, Y, and Z direction acceleration data segments 408, 410, 412 are also referred to as first data segments 408, 410, 412 herein. The X direction acceleration data 402 can be first acceleration data 402, the Y direction acceleration data 404 can be second acceleration data 404, and the Z direction acceleration data 406 can be third acceleration data 406. The first X direction acceleration data segment 408 can be a first data segment 408, the first Y direction acceleration data segment 410 can be a second data segment 410, and the first Z direction acceleration data segment 412 can be a third data segment 412.

In the illustrated example of FIG. 4, the acceleration data 402-406 and the corresponding first data segments 408-412, and, more generally, the first acceleration plots 400, have time in seconds (s) across their horizontal axes (e.g., primary axes, abscissa, etc.) and have acceleration across their vertical axes (e.g., secondary axes, ordinate, etc.). The acceleration unit of the vertical axes of the first acceleration plots 400 is the output unit of the accelerometer 304 before a conversion to a standard unit, and the output unit represents relative magnitude and sign in the first acceleration plots 400.

In the example of FIG. 4, the acceleration data 402-406 is accessed by the on-board diagnostic module 102 (FIG. 1) from the accelerometer 304 (FIG. 3) during operation of the vehicle 100 (FIG. 1) by way of the vehicle bus 114 (FIG. 1) over a time interval of two seconds. In other examples, the on-board diagnostic module 102 can access the acceleration data 402-406 over any suitable time interval (e.g., 5 seconds, 20 seconds, 2 minutes, etc.). For example, the accelerometer 304 can continuously transmit acceleration data 402-406 to the on-board diagnostic module 102. In this example, the acceleration data 402-406 accounts for acceleration in three dimensions. In other examples, a two dimensional or one dimensional convention can be used. Further, though the examples of FIG. 4 are discussed in connection with the vehicle 100 and the on-board diagnostic module 102 for convenience, the examples of FIG. 4 can be applied to the tread depth model controller 104 and one or more accelerometers associated with one or more test vehicles.

In FIG. 4, the acceleration data 402-406 is associated with the revolutions of the tire 200 (FIG. 3). In the illustrated example of FIG. 4, an example first time interval 414 associated with a revolution of the tire 200 is indicated between an example first line 416 and an example second line 418 (e.g., the time between the first line 416 and the second line 418). An example second time interval 420 associated with another revolution of the tire 200 is indicated between an example third line 422 and an example fourth line 424. In the example of FIG. 4, each of the time intervals 414, 420 represents at least a portion of a revolution of the tire 200. Though only the time intervals 414, 420 are annotated in FIG. 4, the acceleration data 402-406 includes a plurality of intervals before, between, and after the time intervals 414, 420, each representing at least a portion of a revolution of the tire 200. The time spanned by the time intervals 414, 420 changes based on the speed of the tire 200. In the example of FIG. 4, each of the intervals 414, 420 includes an acceleration cycle. As used herein, the term "acceleration cycle" refers to the time interval associated with the accelerometer 304 encountering both of the deflection points 208, 210.

In the illustrated example of FIG. 4, the X direction acceleration data 402 includes a sequence of peaks and troughs within each time interval such as the first time interval 414 and/or the second time interval 420. Each peak and trough in the X direction acceleration data 402 can represent an encounter of the accelerometer 304 with the first deflection point 208 and the second deflection point 210 respectively. In other examples, each peak and trough in the X direction acceleration data 402 can represent an encounter of the accelerometer 304 with the second deflection point 210 and the first deflection point 208, respectively. In the X direction acceleration data 402, the peaks are positive acceleration (e.g., +) and the troughs are negative acceleration (e.g., −), both with relatively high magnitudes.

The Y direction acceleration data 404 includes two peaks with a trough disposed therebetween for each time interval such as the first time interval 414 and/or the second time interval 420. However, the Y direction acceleration data 404 includes largely positive acceleration throughout the peaks and toughs. The Z direction acceleration data 406 includes two peaks with a trough therebetween for each time interval such as the first time interval 414 and/or the second time interval 420. In the examples of the Y and Z direction acceleration data 404, 406, each of the two peaks is associated with an encounter of the accelerometer 304 with the first deflection point 208 and the second deflection point 210, respectively.

In the illustrated example of FIG. 4, the on-board diagnostic module 102 can execute one or more processing steps with the acceleration data 402-406. For example, the on-board diagnostic module 102 can apply a moving-average filter to the acceleration data 402-406 to smooth the data. Additionally or alternatively, the on-board diagnostic module 102 can apply any suitable filtering technique to the acceleration data 402-406. Further, the on-board diagnostic module 102 can apply filtering techniques such as the moving-average filter to the first data segments 408-412.

In FIG. 4, the on-board diagnostic module 102 can segment the X direction acceleration data 402 into the first X direction acceleration data segment 408, segment the Y direction acceleration data 404 into the first Y direction acceleration data segment 410, and segment the Z direction acceleration data 406 into the first Z direction acceleration data segment 412. For example, each of the first data segments 408-412 can be the portion of the respective directional components of the acceleration data 402-406 for the first time interval 414, the second time interval 420, or any other time interval including where the accelerometer 304 encounters the deflection points 208, 210 (e.g., cycles). In other examples, the first data segments 408-412 can be the average and/or aggregation of two or more of the time intervals 414, 420, etc. For example, the on-board diagnostic module 102 can determine that a portion or portions of the acceleration data 402-406 is suitable to be segmented into the first data segments 408-412 randomly, sequentially, and/or based on predetermined criteria. In some examples, the first data segments 408-412 can encompass a single acceleration cycle in each of the X, Y, and Z directions, also referred to as a single strike in each of the X, Y, and Z directions. In some examples, the on-board diagnostic module 102 can additionally or alternatively apply the processing aspects such as the moving-average filter to the first data segments 408-412.

In the illustrated example of FIG. 4, the first X direction acceleration data segment 408 includes an example first peak 426 and an example first trough 428. In FIG. 4, the first peak 426 is associated with an encounter of the accelerometer 304 with the first deflection point 208. The first trough 428 is associated with an encounter of the accelerometer 304 with the second deflection point 210. The first X direction acceleration data segment 408 also includes first steady state acceleration sections 430 that are not associated the first peak 426 and first trough 428 and are instead associated with the time of the revolution of the tire 200 outside of the contact area 206 (e.g., the time of revolution of the tire 200 between the second deflection point 210 and the first deflection point 208). The first steady state acceleration sections 430 include local minima and maxima as well, noise, and/or distortion, for example, due to acceleration events caused by vibration, and/or surface roughness of the surface upon which the vehicle 100 is driving, etc.

In the illustrated example of FIG. 4, the first Y direction acceleration data segment 410 includes an example second peak 432, an example third peak 434, and an example second trough 436 disposed therebetween. In FIG. 4, the second peak 432 is associated with an encounter of the accelerometer 304 with the first deflection point 208. The third peak 434 is associated with an encounter of the accelerometer 304 with the second deflection point 210. The first Y direction acceleration data segment 410 also includes second steady state sections 438, including local minima and maxima, noise, and/or distortion, for example, due to acceleration events caused by vibration, and/or surface roughness of the surface upon which the vehicle 100 is driving, etc.

In the illustrated example of FIG. 4, the first Z direction acceleration data segment 412 includes an example fourth peak 440, an example fifth peak 442, and an example third trough 444 disposed therebetween. In FIG. 4, the fourth peak 440 is associated with an encounter of the accelerometer 304 with the first deflection point 208. The fifth peak 442 is associated with an encounter of the accelerometer 304 with the second deflection point 210. The first Z direction acceleration data segment 412 also includes third steady state sections 446, including local minima and maxima, noise, and/or distortion, for example, due to acceleration events caused by vibration, and/or surface roughness of the surface upon which the vehicle 100 is driving, etc. In FIG. 4, the first Z direction acceleration data segment 412 displays similar behavior to that of the first Y direction acceleration data segment 410 at a higher magnitude than the magnitude of the first Y direction acceleration data segment 410.

In the illustrated example of FIG. 4, the first data segments 408-412 include a similar pattern (e.g., cycles, strikes, etc.) to the pattern repeated in the respective acceleration data 402-406. Thus, the first data segments 408-412 are a suitable proxy for the acceleration data 402-406 for the purpose of training the tread depth status model.

Figure 5:
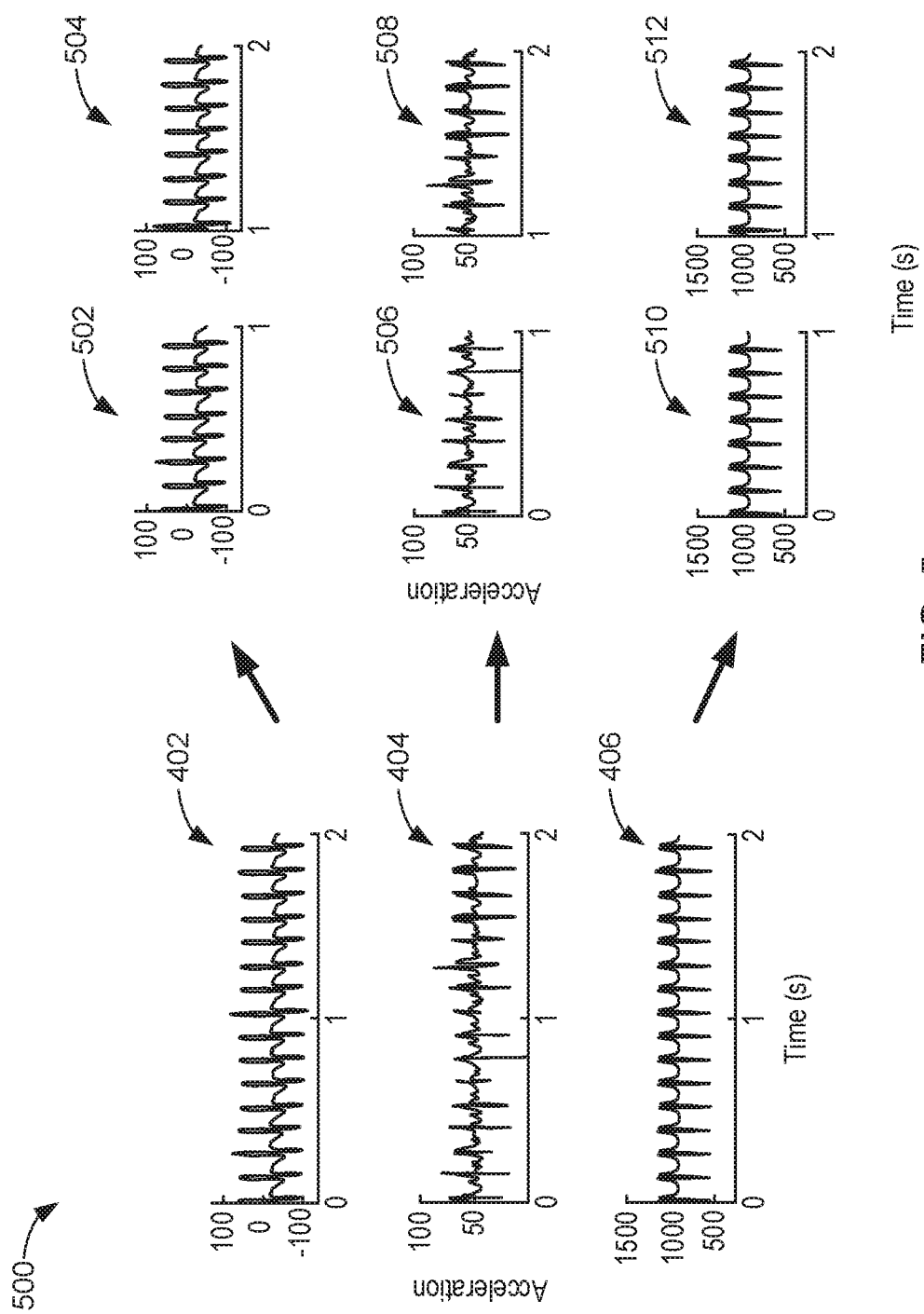
FIG. 5 is a diagram of the example X, Y, and Z direction acceleration data of FIG. 4 and corresponding second and third example X, Y, and Z direction acceleration data segments segmented based on a common time interval.

FIG. 5 includes second example acceleration plots 500 depicting the example X direction acceleration data 402, the example Y direction acceleration data 404, and the example Z direction acceleration data 406 of FIG. 4. The second acceleration plots 500 also depict an example second X direction acceleration data segment 502 and an example third X direction acceleration data segment 504, both corresponding to the X direction acceleration data 402. The second acceleration plots 500 also depict an example second Y direction acceleration data segment 506 and an example third Y direction acceleration data segment 508, both corresponding to the Y direction acceleration data 404. The second acceleration plots 500 also depict an example second Z direction acceleration data segment 510 and an example third Z direction acceleration data segment 512.

The second X, Y, and Z direction acceleration data segments 502, 506, 510 are also referred to herein as second data segments 502, 506, 510. The third X, Y, and Z direction acceleration data segments 504, 508, 512 are also referred to herein as third data segments 504, 508, 512. Further, the second X direction acceleration data segment 502 can be a first data segment 502 and the third X direction acceleration data segment 504 can be a first data segment 504. The second Y direction acceleration data segment 506 can be a second data segment 506 and the third Y direction acceleration data segment 508 can be a second data segment 508. The second Z direction acceleration data segment 510 can be a third data segment 510 and the third Z direction acceleration data segment 512 can be a third data segment 512.

Like the first acceleration plots 400 of FIG. 4, the second acceleration plots 500 have time in seconds (s) across their horizontal axes (e.g., primary axes, abscissa, etc.) and have acceleration across their vertical axes (e.g., secondary axes, ordinate, etc.). The acceleration unit of the vertical axes of the second acceleration plots 500 is the output unit of the accelerometer 304 before a conversion to a standard unit, and the output unit represents relative magnitude and sign in the second acceleration plots 500.

More generally, in the illustrated example of FIG. 5, the second acceleration plots 500 include a basis for segmenting the acceleration data 402-406 that can be used additionally or alternatively to the basis for segmenting the first acceleration plots 400 of FIG. 4 (e.g., the first data segments 408-412). In the example of the second acceleration plots 500, segments of a common time interval (e.g., a time segment) are chosen from the acceleration data 402-406. In FIGS. 4-5, the acceleration data 402-406 is depicted on the time interval of zero to two seconds. The on-board diagnostic module 102 can select, for example, the time interval from zero to one second for each of the acceleration data 402-406 to form the second data segments 502, 506, 510. Additionally or alternatively, the on-board diagnostic module 102 can select, for example, the time interval from one to two seconds from each of the acceleration data 402-406 to form the third data segments 504, 508, 512. In each of these examples, a segment of a relatively shorter time interval is selected from acceleration data of a relatively longer time interval. For example, the on-board diagnostic module 102 can receive a constant stream of acceleration data from the accelerometer 304 resembling the acceleration data 402-406 and can select data from a finite time interval to form a segment. Though the second and third data segments 502-512 are shown on (e.g., span) a time interval of one second, a segment can be selected with any other length of time, such as 0.1 seconds, 2 seconds, 10 seconds, 1 minute, etc.

In contrast to the first data segments 408-412 of FIG. 4, the data segments of FIG. 5 (e.g., the second and third data segments 502-512) are segmented (e.g., formed, selected, etc.) without regard for the acceleration cycles (e.g., strikes, etc.) present within the segment. Any of the acceleration data 402-406 that falls within the selected time interval (e.g., zero to one second, zero to two seconds, etc.) will be included in the resulting acceleration data segment (e.g., the second data segments 502, 506, 510, the third data segments 504, 508, 512 etc.).

In the illustrated example of FIG. 5, like FIG. 4, the on-board diagnostic module 102 can apply a moving-average filter to the acceleration data 402-406 to smooth the data. Additionally or alternatively, the on-board diagnostic module 102 can apply any suitable filtering technique to the acceleration data 402-406. Further, the on-board diagnostic module 102 can apply filtering techniques such as the moving-average filter to the second data segments 502, 506, 510 and/or the third data segments 504, 508, 512.

In the illustrated examples of FIGS. 4 and 5, though the first and second acceleration plots 400, 500 are depicted graphically in a continuous manner, the acceleration data 402-406 and the first, second, and third data segments 408-412, 502-512 can each be transmitted by the accelerometer 304 as a digital and/or analog signal and stored on the on-board diagnostic module 102 and/or the tread depth model controller 104 as a finite numerical data set for processing. For example, the accelerometer 304 can record the acceleration data 402-406 at a discrete sampling rate with a timestamp and can transmit the samples and their corresponding timestamps to the tread depth model controller 104 and/or the on-board diagnostic module 102, etc.

Figure 6:
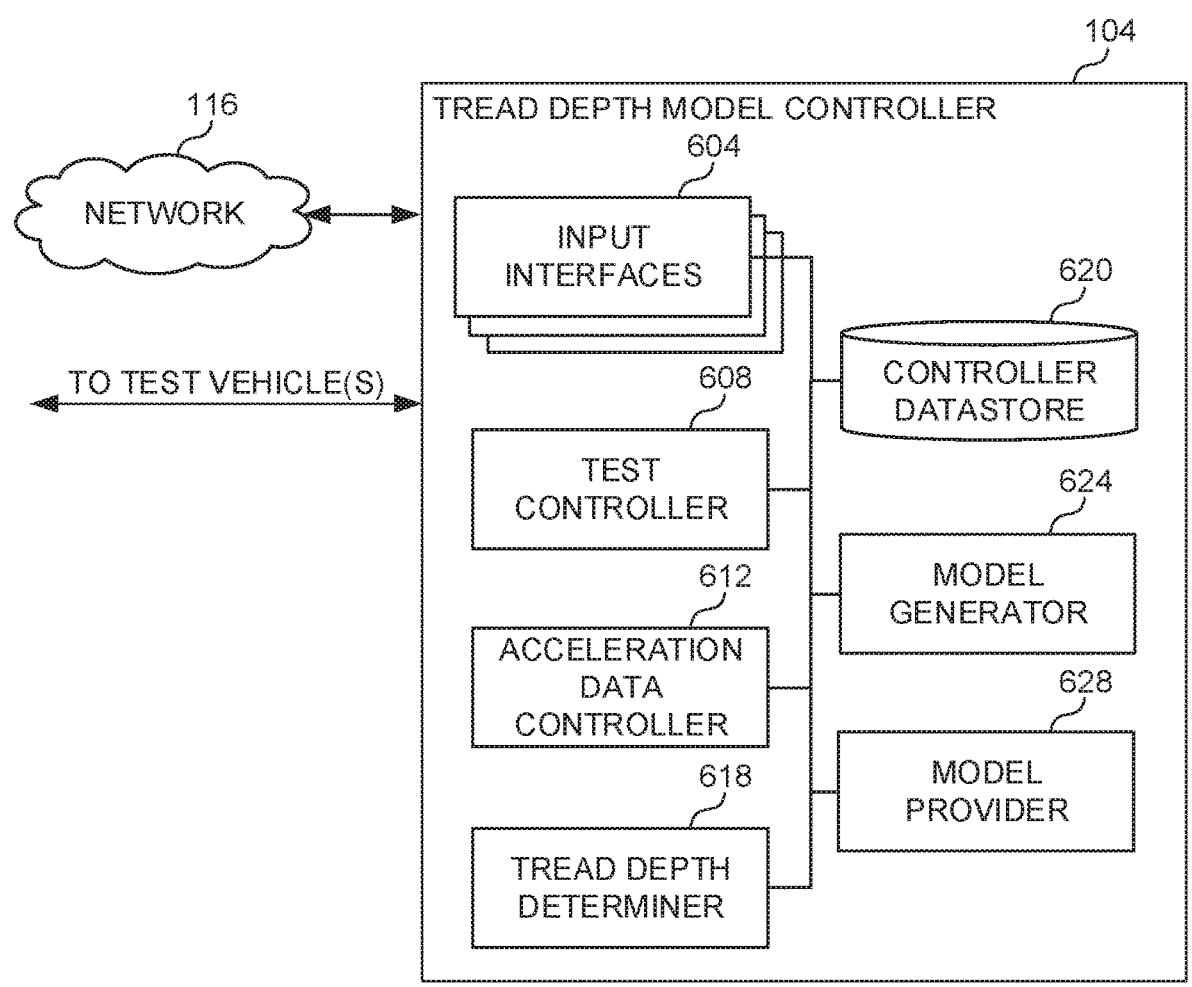
FIG. 6 is a block diagram of the example tread depth model controller of FIG. 1.

FIG. 6 is a block diagram of the example tread depth model controller 104 of FIG. 1 to generate and/or train a tread depth status model. The example tread depth model controller 104 includes example first input interfaces 604, an example test controller 608, an example acceleration data controller 612, an example tread depth determiner 618, an example controller datastore 620, an example model generator 624, and an example model provider 628. The example tread depth model controller 104 is communicatively coupled to the network 116 (FIG. 1) and to one or more test vehicles.

In the illustrated example of FIG. 6, the tread depth model controller 104 includes one or more first input interfaces 604 to access measured tread depths 318 (FIG. 3), tread depth status model application data, additional data, etc. to train one or more tread depth status models. The first input interfaces 604 can include one or more network interfaces to receive information such as tread depth status model application data from one or more on-board diagnostic modules 102 (FIG. 1) via the network 116. For example, the first input interfaces 604 can also access preset and/or manually input training data.

In the illustrated example of FIG. 6, the tread depth model controller 104 includes the example test controller 608 to conduct one or more tests to generate training data to generate a tread depth status model. In the illustrated example of FIG. 6, the test controller 608 can access processed acceleration data including, for example, an augmented power spectrum density (e.g., a single power spectrum density matrix and/or vector, etc.) from the acceleration data controller 612 and can access the measured tread depth 318 from the tread depth determiner 618 for each test. The test controller 608 can also access available application data such as the acceleration data 402-406 (FIG. 4), augmented power spectrum densities, tread depth statuses, measured tread depths 318, and/or the additional data from one or more on-board diagnostic modules 102. More generally, the test controller 608 can access training data to generate (e.g., train) a tread depth status model.

In the illustrated example of FIG. 6, the tread depth model controller 104 includes the example acceleration data controller 612 to access, gather, and/or process the acceleration data 402-406 from the accelerometer 304. The acceleration data controller 612 is discussed in further detail in connection with FIG. 7.

In the illustrated example of FIG. 6, the tread depth model controller 104 includes the example tread depth determiner 618 to determine and/or access the measured tread depth 318 associated with one or more test vehicles. The tread depth determiner 618 can access tread depths that have been manually measured by, for example, a tread depth gauge via the first input interfaces 604. Additionally or alternatively, the tread depth determiner 618 can access tread depths measured by, for example, one or more sensors via the first input interfaces 604.

In the illustrated example of FIG. 6, the tread depth model controller 104 includes the example controller datastore 620 to store information accessed and/or processed by the tread depth model controller 104. The controller datastore 620 can store the acceleration data 402-406, measured tread depths 318, tread depth status models, tread depth status model application data, and/or additional data, all such data collectively referred to as training data. The controller datastore 620 can also store data such as the first, second, and/or third data segments 408-412, 502-512 (FIGS. 4-5) and associated power spectrum densities, the augmented power spectrum density, etc.

In the illustrated example of FIG. 6, the tread depth model controller 104 includes the model generator 624. The model generator 624 can access training data and, in turn, generate a tread depth status model (e.g., a predictive model). The model generator 624 can access training data for each test of a plurality of tests. The model generator 624 can access a measured tread depth 318 and a corresponding augmented power spectrum density for each test of a plurality of tests along with application data (e.g., collectively, the training data), and can use an AI and/or ML model such as a SVM or a NN to generate (e.g., train) the tread depth status model (e.g., a predictive model) to predict a tread depth status of the one or more tires 106-112 (FIG. 1) of a vehicle such as the vehicle 100. In some examples, the model generator 624 can generate a regression to predict the predicted tread depth 318 (e.g., a numerical tread depth value) based on, for example, the augmented power spectrum density.

In the illustrated example of FIG. 6, the tread depth model controller 104 includes the model provider 628 to provide the one or more tread depth status models (e.g., predictive models) generated by the model generator 624 to one or more vehicles such as the vehicle 100. The model provider 628 can, for example, transmit the one or more tread depth status models to one or more of the on-board diagnostic modules 102 of respective vehicles 100 via the network 116. The model provider 628 can also transmit the one or more tread depth status models to the vehicles 100 via any number of wired or wireless mediums. For example, the model provider 628 may provide a model to an intermediate location where a tread depth status model is preprogrammed (e.g., preset, preloaded, etc.) onto an ECU of a vehicle such as the vehicle 100.

Figure 7:
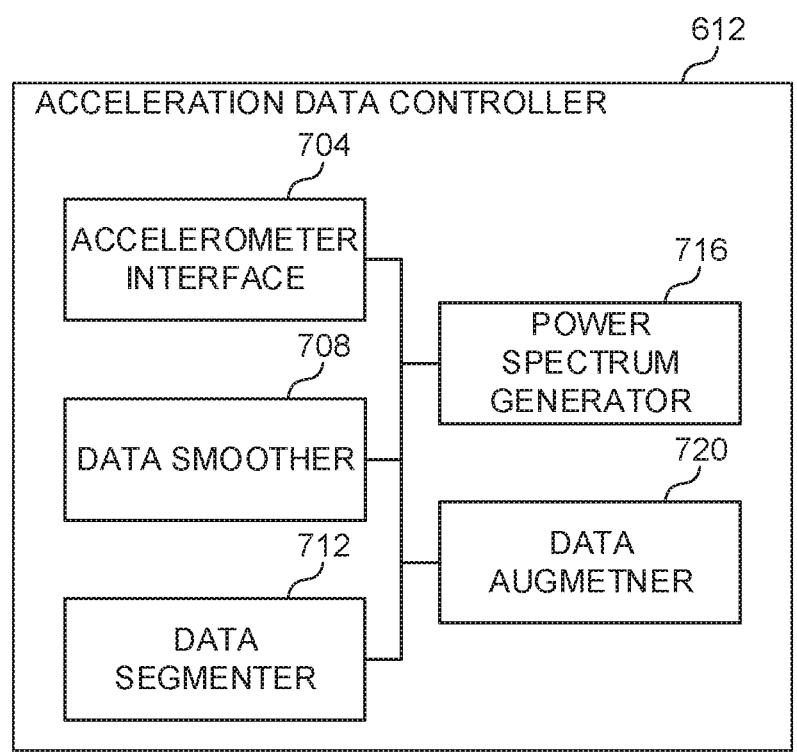
FIG. 7 is a block diagram of an example acceleration data controller.

FIG. 7 is a block diagram of the example acceleration data controller 612 of FIG. 6 implemented in connection with the tread depth model controller 104 of FIGS. 1 and/or 6 to access, gather, and/or process the acceleration data 402-406 FIG. 4. The example acceleration data controller 612 is also implemented in connection with the on-board diagnostic module 102 of FIG. 1 and is discussed further FIG. 8. In FIG. 7, the acceleration data controller 612 includes an example accelerometer interface 704, an example data smoother 708, an example data segmenter 712, an example power spectrum generator 716, and an example data augmenter 720.

In the illustrated example of FIG. 7, the acceleration data controller 612 includes the example accelerometer interface 704 to access and/or receive the acceleration data 402-406 from the accelerometer 304 (FIG. 3) of a vehicle such as the vehicle 100 and/or one or more test vehicles. In FIG. 7, the accelerometer interface 704 can access the acceleration data 402-406 via one or more wired or wireless connections (e.g., one or more receivers, one or more transceivers, etc.). For example, the accelerometer interface 704 can access the acceleration data 402-406 contained in an analog and/or digital signal via a vehicle bus such as the vehicle bus 114 of FIG. 1 (via a wired or wireless connection such as a CAN bus and/or RF module such as a Bluetooth® interface, a NFC interface, etc.). In some examples, the accelerometer interface 704 can access acceleration data in a continuous manner during operation of the vehicle from the accelerometer 304. In some examples, the accelerometer interface 704 can access the acceleration data 402-406 a discrete manner (e.g., a digital signal) during and/or shortly after the acceleration data 402-406 is recorded by the accelerometer 304. In these examples, the accelerometer interface 704 can access discrete acceleration samples. In some examples, the accelerometer interface 704 can access a particular time interval of acceleration data 402-406 after the accelerometer 304 has recorded the acceleration data.

In the illustrated example of FIG. 7, the acceleration data controller 612 includes the data smoother 708 to apply one/or more filtering techniques to the acceleration data 402-406 to remove noise (e.g., irregular data) from the acceleration data 402-406. For example, the data smoother 708 can apply a moving average filter to the acceleration data 402-406 by taking the average of a preceding number of samples n, with or without weighting, to produce an acceleration data point in filtered acceleration data. The data smoother 708 can additionally or alternatively apply other filtering techniques, such as a low pass filter. The data smoother 708 can apply the one or more filtering techniques before or after the representation of the acceleration data 402-406 in FIG. 4.

In the illustrated example of FIG. 7, the acceleration data controller 612 includes the data segmenter 712 to segment the acceleration data 402-406 into data segments such as the first, second, and/or third data segments 408-412, 502-512. The data segmenter 712 can segment the acceleration data 402-406 into the first data segments 408-412 such that the first data segments 408-412 encompass a single acceleration cycle (e.g., a partial or whole revolution of the tire 200 such that the accelerometer 304 encounters the deflection points 208, 210 of FIG. 2). For example, the data segmenter 712 can aggregate and/or average two or more cycles (e.g., strikes) to produce a segment. Additionally or alternatively, the data segmenter 712 can segment the acceleration data 402-406 into the second data segments 502, 506, 510 and the third data segments 504, 508, 512 based on, for example, a predetermined and/or suitable time interval.

In the illustrated example of FIG. 7, the acceleration data controller 612 includes the power spectrum generator 716 to generate the augmented power spectrum density of one or more data segments such as the first, second, and/or third data segments 408-412, 502-512. The power spectrum generator 716 can generate a first power spectrum density associated with the first X direction acceleration data segment 408, the second X direction acceleration data segment 502, and/or the third acceleration data segment 504. The power spectrum generator 716 can generate a second power spectrum density associated with the first Y direction acceleration data segment 410, the second Y direction acceleration data segment 506, and/or the third Y direction acceleration data segment 508. The power spectrum generator 716 can generate a third power spectrum density associated with the first Z direction acceleration data segment 412, the second Z direction acceleration data segment 510, and/or the third Z direction acceleration data segment 512. In other examples, the power spectrum generator 716 can generate another value, vector, and/or spectrum (e.g., a statistic) representative of the first, second, and/or third data segments 408-412, 502-512 (e.g., a weighted average, an energy spectral density, etc.) and/or an augmented data segment, etc.

In the illustrated example of FIG. 7, the acceleration data controller 612 includes the data augmenter 720 to augment one or more data sources into an augmented and/or aggregated data. The data augmenter 720 can, for example, augment the first, second, and/or third power spectrum densities generated by the power spectrum generator 716 into the augmented power spectrum density by placing each of the first, second, and/or third power spectrum densities in a single matrix and/or vector.

While an example manner of implementing the tread depth model controller 104 is illustrated in FIGS. 1, 6, and/or 7, one or more of the elements, processes and/or devices illustrated in FIGS. 1, 6, and/or 7 may be combined, divided, re-arranged, omitted, eliminated and/or implemented in any other way. Further, the example accelerometer interface 704, the example data smoother 708, the example data segmenter 712, the example power spectrum generator 716, the example data augmenter 720, and/or, more generally, the example acceleration data controller 612 of FIGS. 6 and/or 7, the example first input interfaces 604, the example test controller 608, the example acceleration data controller 612, the example tread depth determiner 616, the example model generator 624, the example model provider 628, and/or, more generally, the example tread depth model controller 104 of FIGS. 1, 6, and/or 7 may be implemented by hardware, software, firmware and/or any combination of hardware, software and/or firmware. Thus, for example, any of the example accelerometer interface 704, the example data smoother 708, the example data segmenter 712, the example power spectrum generator 716, the example data augmenter 720, and/or, more generally, the example acceleration data controller 612 of FIGS. 6 and/or 7, the example first input interfaces 604, the example test controller 608, the example acceleration data controller 612, the example tread depth determiner 616, the example model generator 624, the example model provider 628, and/or, more generally, the example tread depth model controller 104 of FIGS. 1, 6, and/or 7 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example accelerometer interface 704, the example data smoother 708, the example data segmenter 712, the example power spectrum generator 716, the example data augmenter 720, and/or, more generally, the example acceleration data controller 612 of FIGS. 6 and/or 7, the example first input interfaces 604, the example test controller 608, the example acceleration data controller 612, the example tread depth determiner 616, the example model generator 624, the example model provider 628, and/or, more generally, the example tread depth model controller 104 of FIGS. 1, 6, and/or 7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example tread depth model controller 104 of FIGS. 1, 6, and/or 7 may include one or more elements, processes and/or devices in addition to, or instead of, those illustrated in FIGS. 1, 6, and/or 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
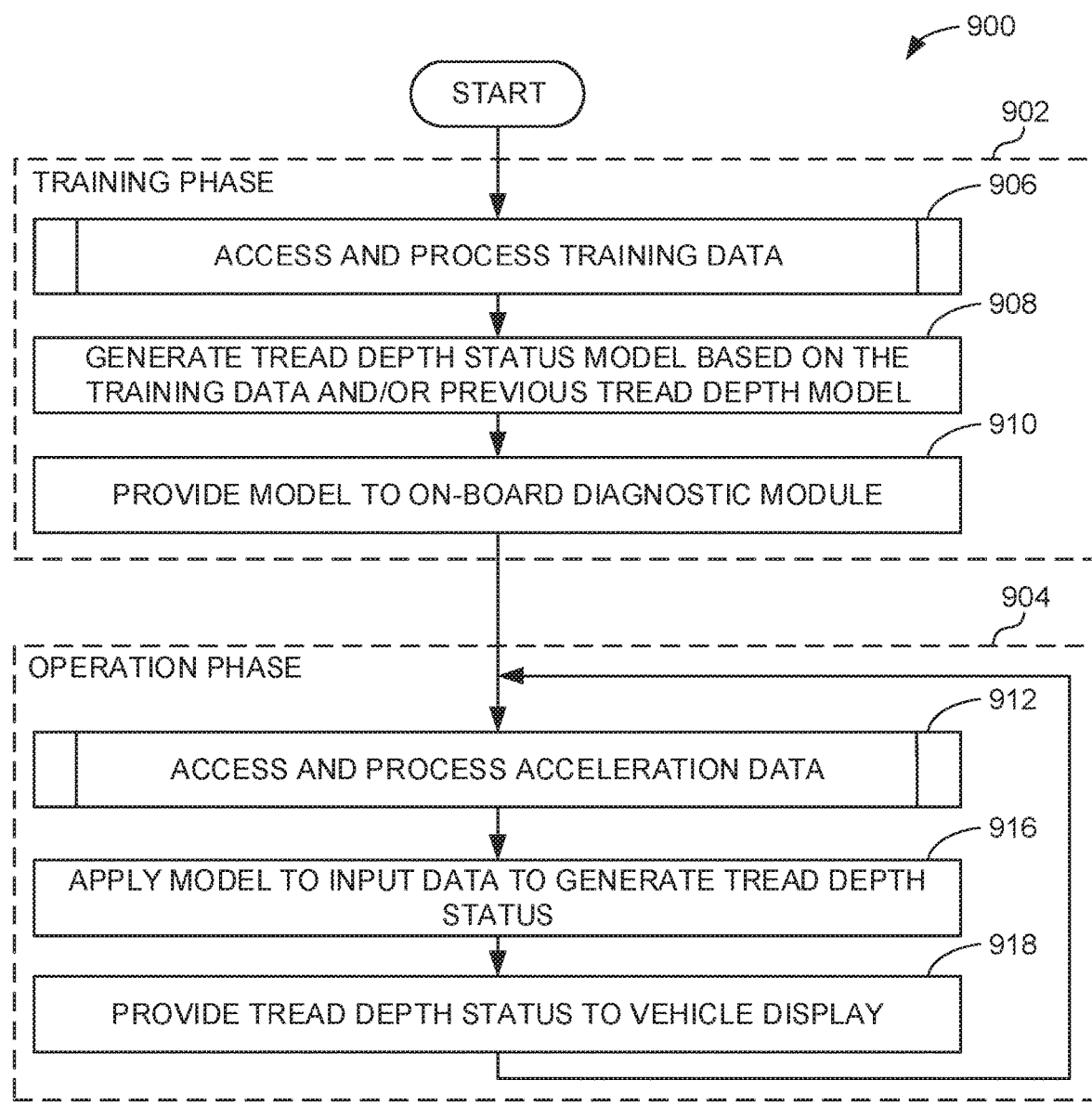
FIG. 9 is a flowchart representative of machine readable instructions which may be executed to implement the example tread depth model controller of FIGS. 1 and/or 6, the example acceleration data controller of FIGS. 6, 7, and/or 8, and/or the example on-board diagnostic module of FIGS. 1 and/or 8 for an example training phase and an example operation phase.
Figure 10:
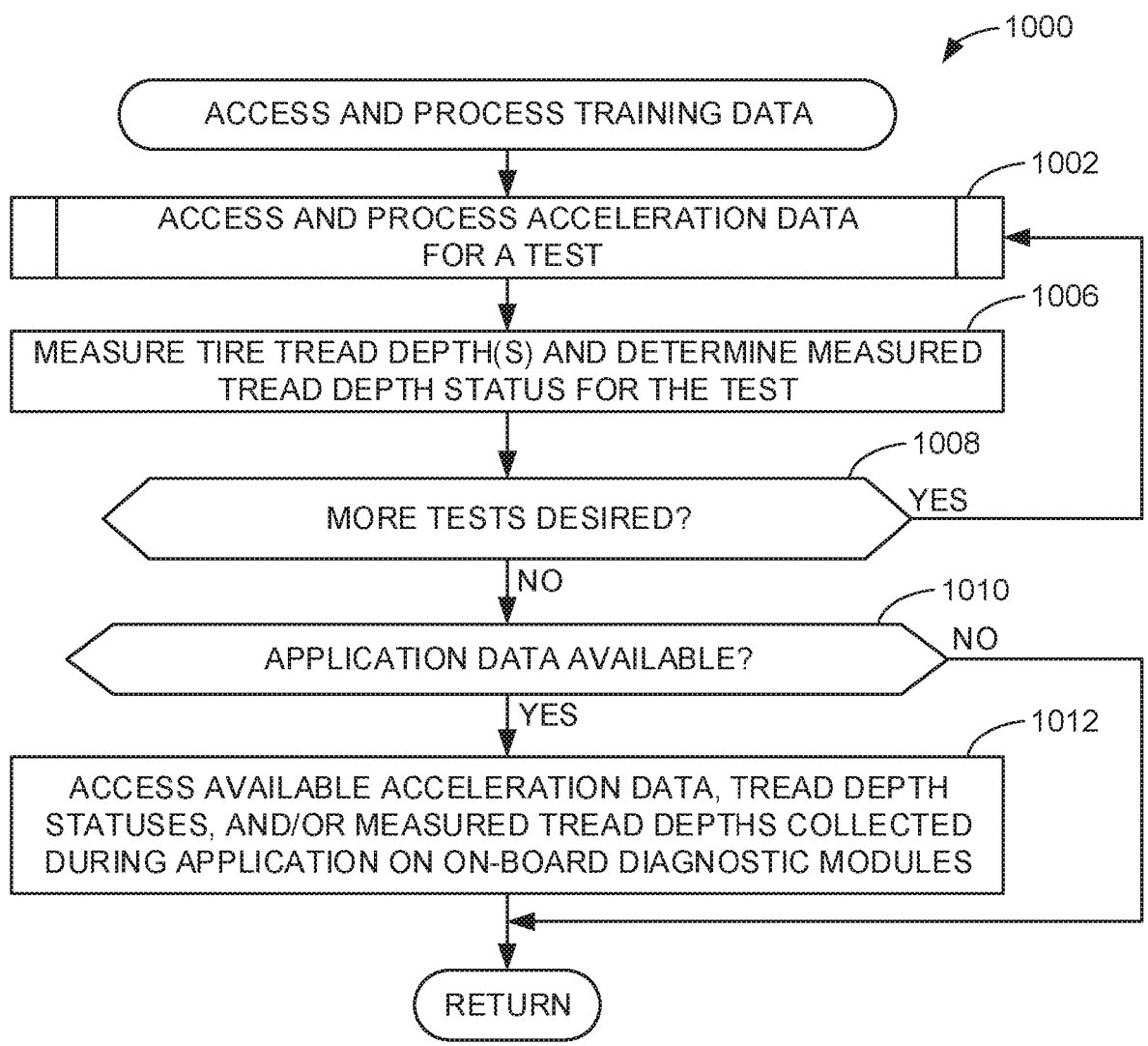
FIG. 10 is a flowchart representative of machine readable instructions which may be executed to implement the example tread depth model controller of FIGS. 1 and/or 6 and the example acceleration data controller of FIGS. 6 and/or 7 to gather and process training data.

Flowcharts representative of example hardware logic, machine readable instructions, hardware implemented state machines, and/or any combination thereof for implementing the tread depth model controller 104 of FIGS. 1, 6, and/or 7 are shown in FIGS. 9, 10, and/or 11. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 9, 10, and/or 11, many other methods of implementing the example tread depth model controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9, 10, and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
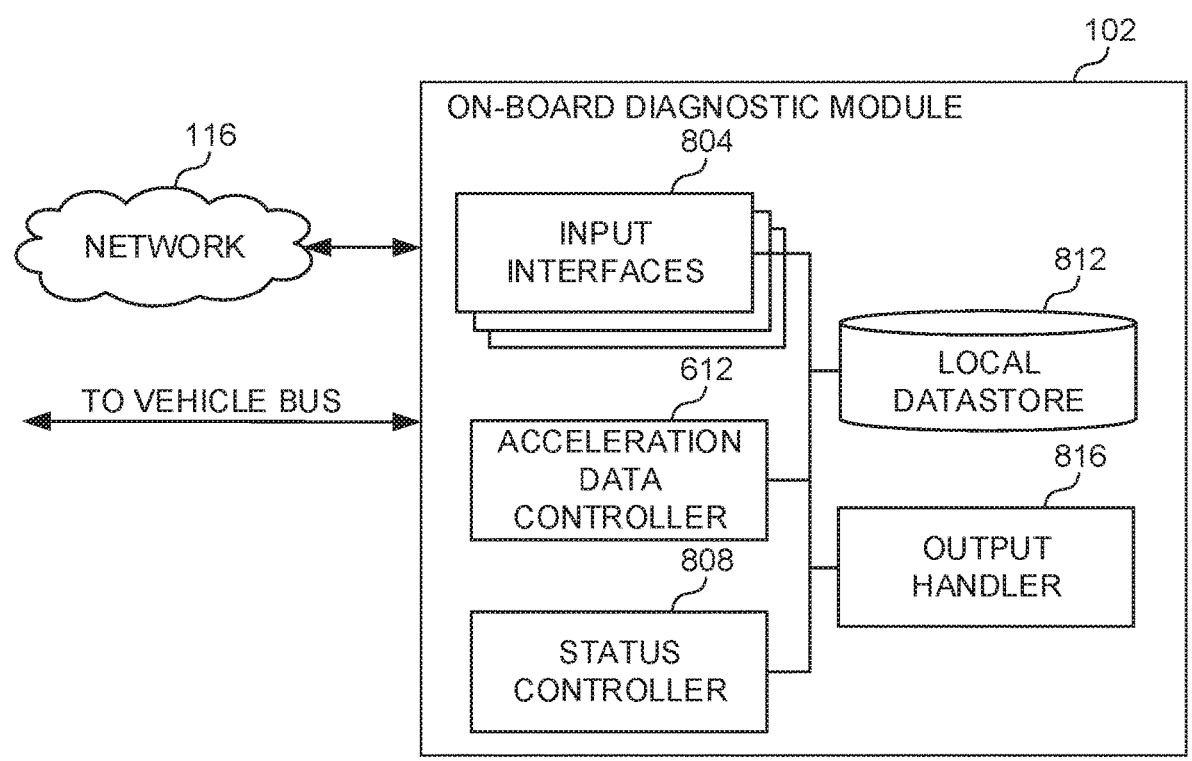
FIG. 8 is a block diagram of the example on-board diagnostic module of FIG. 1.

FIG. 8 is a block diagram of the example on-board diagnostic module 102 of FIG. 1 to apply a tread depth status model to determine a tread depth status of a vehicle such as the vehicle 100 of FIG. 1. The example on-board diagnostic module 102 includes example second input interfaces 804, the example acceleration data controller 612 of FIG. 7, an example status controller 808, an example local datastore 812, and an example output handler 816. The example tread depth model controller 104 is communicatively coupled to the network 116 and to the vehicle bus 114, both of FIG. 1, of the vehicle 100. For example, the on-board diagnostic module 102 can be implemented by an ECU of the vehicle 100.

The second input interfaces 804 can include one or more network interfaces to receive information (e.g., tread depth status models) from the tread depth model controller 104 (FIG. 1) via the network 116. For example, the second input interfaces 804 can include any number of wired or wireless connections to access, for example, one or more tread depth status models. For example, one or more tread depth status models can be preloaded and/or preset on the on-board diagnostic module 102 via the second input interfaces 804. The second input interfaces 804 can access available additional data (e.g., tire and/or vehicle make, model, size, age, usage, vehicle load, vehicle speed, tire pressure, temperature etc.) associated with the vehicle 100.

In the illustrated example of FIG. 8, the on-board diagnostic module 102 includes the example acceleration data controller 612 to access, gather, and/or process acceleration data such as acceleration data 402-406 (FIG. 4) from the accelerometer 304 (FIG. 3) of the vehicle 100. The acceleration data controller 612 is discussed in further detail in connection with FIG. 7. In the illustrated example of FIG. 8, the acceleration data controller 612 of the on-board diagnostic module 102 is physically distinct from the acceleration data controller 612 of the tread depth model controller 104. Accordingly, the acceleration data controller 612 of the on-board diagnostic module 102 can operate independently of the acceleration data controller 612 of the tread depth model controller 104.

In the illustrated example of FIG. 8, the on-board diagnostic module 102 includes the status controller 808 to determine a tread depth status of the vehicle 100. The status controller 808 can receive an augmented power spectrum density from the acceleration data controller 612 and/or past tread depth status model applications for the vehicle 100. In turn, the status controller 808 can apply a tread depth status model to determine a tread depth status of one or more of the tires 106-112 (FIG. 1) associated with the vehicle 100. In some examples, the status controller 808 can receive the augmented power spectrum density from the acceleration data controller 612 and can generate (e.g., predict), based on a tread depth model including a regression, the predicted tread depth 318.

In the illustrated example of FIG. 8, the on-board diagnostic module 102 includes the local datastore 812. The local datastore 812 is configured to store one or more tread depth status models, one or more tread depth statuses of the vehicle 100, one or more tread depth models, one or more predicted tread depths 318, additional data associated with the vehicle 100, and/or data associated with the acceleration data controller 612. The data associated with the acceleration data controller 612 can include the acceleration data 402-406, the first, second, and/or third data segments 408-412, 502-512, first second and third power spectrum densities associated with the first, second, and/or third data segments 408-412, 502-512, single augmented power spectrum densities, single augmented data segments, etc.

In the illustrated example of FIG. 8, the on-board diagnostic module 102 includes the output handler 816 to provide a tread depth status determination of the tread depth status model to, for example, the display 115 (FIG. 1) of the vehicle 100. For example, the output handler 816 can provide a tread depth status indicative of a tread depth range and/or a tread depth status indicative of a tread depth satisfying a threshold to the display 115. The output handler 816 can provide a tread depth status to the display 115 of the vehicle 100, for example, via the vehicle bus 114. For example, the output handler 816 can provide a numerical predicted tread depth 318 to the display 115.

While an example manner of implementing the on-board diagnostic module 102 is illustrated in FIGS. 1, 7, and/or 8, one or more of the elements, processes and/or devices illustrated in FIG. 5 may be combined, divided, re-arranged, omitted, eliminated and/or implemented in any other way. Further, the example accelerometer interface 704, the example data smoother 708, the example data segmenter 712, the example power spectrum generator 716, and/or, more generally, the example acceleration data controller 612 of FIGS. 7 and/or 8, the example second input interfaces 804, the example status controller 808, the example output handler 816 and/or, more generally, the example on-board diagnostic module 102 of FIGS. 1, 7, and/or 8 may be implemented by hardware, software, firmware and/or any combination of hardware, software and/or firmware. Thus, for example, any of the example accelerometer interface 704, the example data smoother 708, the example data segmenter 712, the example power spectrum generator 716, and/or, more generally, the example acceleration data controller 612 of FIGS. 7 and/or 8, the example second input interfaces 804, the example status controller 808, the example output handler 816 and/or, more generally, the example on-board diagnostic module 102 of FIGS. 1, 7, and/or 8 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example accelerometer interface 704, the example data smoother 708, the example data segmenter 712, the example power spectrum generator 716, and/or, more generally, the example acceleration data controller 612 of FIGS. 7 and/or 8, the example second input interfaces 804, the example status controller 808, the example output handler 816 and/or, more generally, the example on-board diagnostic module 102 of FIGS. 1, 7, and/or 8 is/are hereby expressly defined to include a non-transitory computer readable storage device or storage disk such as a memory, DVD, CD, a Blu-ray disk, etc. including the software and/or firmware. Further still, the example on-board diagnostic module 102 of FIGS. 1, 7, and/or 8 may include one or more elements, processes and/or devices in addition to, or instead of, those illustrated in FIGS. 1, 7, and/or 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the on-board diagnostic module 102 of FIGS. 1, 7, and/or 8 are shown in FIGS. 9 and/or 11. The machine readable instructions may be one or more executable programs or portion(s) of an executable program for execution by a computer processor such as the processor 1312 shown in the example processor platform 1300 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 5, many other methods of implementing the example on-board diagnostic module 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9 and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

FIG. 9 is a flowchart representative of machine readable instructions 900 which may be executed to implement the example tread depth model controller 104 of FIGS. 1 and/or 6, the example acceleration data controller 612 of FIGS. 6, 7, and/or 8, and/or the example on-board diagnostic module 102 of FIGS. 1 and/or 8 for an example training phase 902 and an example operation phase 904. The examples of FIG. 9 use AI/ML to train and deploy an example tread depth status model to determine a tread depth status of the example tires 106-112 of the vehicle 100 of FIG. 1.

AI, including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, an SVM and/or NN model is used. Using an SVM and/or a NN model enables the model generator 624 of the tread depth model controller 104 to generate a predictive tread depth status model to predict a tread depth status based on input data (e.g., the augmented power spectrum density, etc.). In general, machine learning models/architectures that are suitable to use in the example approaches disclosed herein will be supervised learning ML/AI models such as an SVM and/or NN to produce a tread depth status model (e.g., a tread depth classification model) based on labeled training data. However, other types of machine learning models could additionally or alternatively be used such as unsupervised learning models, etc.

In general, implementing a ML/AI system involves two phases, a learning/training phase (e.g., the training phase 902) and an inference phase (e.g., the operation phase 904). In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, a target variable, etc.). In some examples disclosed herein, the labeled outputs (e.g., the target variables) are tread depth statuses and/or tread depths. Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed at a central facility in connection with the model generator 624 (FIG. 6) and, more generally, the tread depth model controller 104. Training is performed using hyperparameters that control how the learning is performed (e.g., a learning rate, a number of layers to be used in the machine learning model, etc.). In some examples re-training may be performed. Such re-training may be performed in response to additional training data becoming available, for example, when the tread depth model controller 104 accesses additional tests and/or application data from one or more of the on-board diagnostic modules 102 and/or, for example, measured tread depths 318 corresponding to the respective vehicles 100 of the on-board diagnostic modules 102.

Training is performed using training data. In examples disclosed herein, the training data primarily originates from tests conducted at the central facility with test vehicles. Because supervised training is used, the training data is labeled. Labeling is applied to the training data by determining the measured tread depth 318 (FIG. 3) associated with one or more tires 200 (FIG. 2) of the test vehicles and/or an example measured tread depth status associated with the measured tread depth 318 of the test vehicles. In some examples, the training data is processed using, for example, the tread depth determiner 618 (FIG. 6) to assign a measured tread depth status to the measured tread depth 318. For example, if the tread depth status model is to determine if the tread depth 318 is above a threshold (e.g., an acceptable status) or below a threshold (e.g., an unacceptable status), the tread depth determiner 618 can classify the measured tread depth 318 into a measured tread depth status associated with augmented power spectrum density of a test. For example, if the threshold is 3/32 in., and the measured tread depth 318 is 5/32 in., the tread depth determiner can assign a tread depth status of acceptable to the power spectrum density. In some disclosed examples, the training data is processed using, for example, the acceleration data controller 612 (FIG. 6) to generate the augmented power spectrum density from acceleration data such as the acceleration data 402-406 (FIG. 4). In some examples, a portion of the training data is, for example, validation data.

Once training is complete, the tread depth status model is deployed for use as an executable construct that processes an input and provides an output based on the network of nodes and connections defined in the tread depth status model. The tread depth status model is stored at the controller datastore 620 (FIG. 6) of the tread depth model controller 104, and the model provider 628 (FIG. 6) provides the tread depth status model to the local datastore 812 (FIG. 8) of one or more of the on-board diagnostic modules 102 associated with respective vehicles 100. The tread depth status model may then be executed by the status controller 808 (FIG. 8) of the on-board diagnostic module 102. In some examples, the status controller 808 and, more generally, the on-board diagnostic module 102 can execute the tread depth status model on an ECU of the vehicle 100.

Once trained, the deployed tread depth status model may be operated in an inference phase (e.g., the operation phase 904) to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed tread depth status model (e.g., the application data) may be captured and provided as feedback to, for example, the tread depth model controller 104. By analyzing the feedback, an accuracy of the deployed tread depth status model can be determined. If the feedback indicates that the accuracy of the deployed model is less than a threshold or other criterion, training of an updated model can be triggered using the feedback and an updated training data set, hyperparameters, etc., to generate an updated, deployed model.

Returning now to FIG. 9, the machine readable instructions 900 of FIG. 9 and the training phase 902 begin when the tread depth model controller 104 accesses and processes training data to train a tread depth status model. (Block 906). An example approach for accessing and processing training data is discussed in further detail in connection with FIG. 10. In FIG. 9, the first input interfaces 604, the test controller 608, the tread depth determiner 618, and/or the acceleration data controller 612 of FIGS. 6 and/or 7 access and process the training data.

In some examples disclosed herein, the training data includes data accessed and/or processed from a plurality of tests conducted by the test controller 608. The training data includes measured tread depth statuses (e.g., "acceptable", "unacceptable", etc.). The measured tread depth statuses are the prospective outputs, the labeled outputs, the target variables, etc. The training data also includes the augmented power spectrum densities associated with respective tests (e.g., the inputs). The training data can also include additional data for the tests and/or test vehicles (e.g., tire and/or vehicle make, model, size, age, usage, vehicle load, vehicle speed, tire pressure, temperature etc.). The training data can also include application data from previously iterated tread depth status models including, for example, acceleration data 402-406, tread depth statuses, measured tread depths 318, and/or measured tread depth statuses for vehicles 100. Though the training phase 902 is discussed in connection with machine readable instructions 900, any portion of the training phase 902 can additionally or alternatively be completed manually.

The model generator 624 (FIG. 6) of the tread depth model controller 104 then generates a tread depth status model (e.g., a currently iterated tread depth status model) based on the training data and/or previously iterated tread depth status models. (Block 908). For example, the model generator 624 can use the training data in connection with a ML/AI model such as a SVM and/or NN to generate a tread depth status model that can predict a tread depth status based on input data (e.g., power spectrum densities). Additionally or alternatively, in some examples, the model generator 624 can generate a tread depth model to predict a numerical tread depth 318 using, for example, a regression.

The tread depth status can be one of, for example, "acceptable" indicating that the tread depth 318 exceeds a threshold, or "unacceptable" indicating that the tread depth 318 is below the threshold and needs immediate attention. The tread depth threshold can be, for example, $\frac{3}{32}$ in. Additionally or alternatively, the tread depth status can be one of, for example, "good condition" indicating that the tread depth 318 is above a high threshold, "moderate wear condition" indicating that the tread depth 318 is between the high threshold and a low threshold, or "unacceptable" indicating that the tread depth 318 is below the low threshold an needs immediate attention. For example, the high threshold can be $\frac{7}{32}$ in. and the low threshold can be $\frac{3}{32}$ in. In other examples, any other suitable range and number of thread depths 318 and/or thresholds can be used.

The model provider 628 can provide (e.g., deploy) the tread depth status model to the on-board diagnostic module 102 associated with the vehicle 100. (Block 910). For example, the model provider 628 can provide the tread depth status model to the on-board diagnostic module 102 via the network 116 (FIG. 1), during, for example a software update of the vehicle 100. Additionally or alternatively, the model provider 628 can provide the tread depth status model to the second input interfaces 804 (FIG. 8) of the on-board diagnostic module 102 via any suitable wired and/or wireless connection during, for example, production of the vehicle 100 or a service event of the vehicle 100.

The operation phase 904 of the machine readable instructions 900 begins when the acceleration data controller 612 associated with the on-board diagnostic module 102 accesses and processes the acceleration data 402-406. (Block 912). An example approach for accessing and processing the acceleration data 402-406 is discussed in further detail in connection with FIG. 11. The acceleration data controller 612 can generate the augmented power spectrum density associated with the acceleration data 402-406 for use as input data to the tread depth status model (e.g., the predictive model).

Though the operation phase 904 is discussed herein in connection with a single on-board diagnostic module 102 associated with the vehicle 100, the tread depth status model generated by the tread depth model controller 104 of the training phase 902 can be provided to a plurality of on-board diagnostic modules 102 associated with respective vehicles 100. Thus, the operation phase 904 can be implemented by the plurality of on-board diagnostic modules 102 to determine tread depth status(es) for their respective vehicles 100.

The status controller 808 applies the tread depth status model (e.g., the predictive model) to generate a tread depth status (e.g., a prediction) based on the augmented power spectrum density. (Block 916). For example, if the tread depth status model is trained to classify the input data as associated with an acceptable tread depth 318 or an unacceptable tread depth 318, the status controller 808 can predict, using the input data with the tread depth status model, that the tread depth status of one or more tires (e.g., one of the tires 106-112) is acceptable or unacceptable. Additionally or alternatively, for example, if the tread depth status model is trained to classify the input data as associated with an acceptable tread depth 318, a tread depth 318 of a moderate wear condition, or an unacceptable tread depth 318, the tread depth status model can predict using the input data with the tread depth status model that the tread depth status of the one or more tires is acceptable, unacceptable, or of a moderate wear condition.

In some examples, the tread depth status model can consider available additional data such as vehicle and tire make, model, tread depth history, vehicle load, vehicle speed, tire pressure, temperature etc., when determining the tread depth status. In some examples, at block 916, the on-board diagnostic module 918 can predict a numerical tread depth 318 with a tread depth model.

The output handler 816 provides the tread depth status to the display 115 (FIG. 1) of the vehicle 100. (Block 918). The output handler 816 can provide a tread depth status indicative of a likely tread depth range (e.g., acceptable, unacceptable, or moderate wear condition) and/or a tread depth status indicative of the tread depth 318 satisfying a threshold (e.g., acceptable or unacceptable) to the display 115 (e.g., an infotainment system, a dashboard warning light, etc.). The output handler 816 can provide a tread depth status to the display 115 of the vehicle 100, for example, via the vehicle bus 114, via the network 116, and/or via any other suitable wired or wireless connection. In some example, the status controller 808 can produce two or more tread depth statuses in order to increase confidence in the tread depth status prediction before the output handler 816 presents the tread depth status to the display 115.

In the examples disclosed herein, the on-board diagnostic module 102 can determine a tread depth status and/or a tread depth of a single tire (e.g., the FL tire 106 of FIG. 1), two tires (e.g., the FL and FR tires 106, 108 of FIG. 1), three tires (e.g., the FL, FR, and RL tires 106-110 of FIG. 1), and/or four tires (e.g., the FL, FR, RL, and RR tires 106-112 of FIG. 1), etc., of the vehicle 100, and the output handler 816 can present the tread depth(s) and/or tread depth status(es) to the display 115. The on-board diagnostic module 102 can determine a tread depth and/or a tread depth status for each tire (e.g., the tires 106-112) of the vehicle 100 based on acceleration data 402-406 from each tire. Additionally or alternatively, the acceleration data 402-406 can be generated for one or more tires (e.g., one or more of the tires 106-112) including accelerometers 304 (e.g., tires with available data) and a tread depth and/or a tread depth status can be determined for the one or more tires. For example, the tread depth and/or tread depth status can be representative of tires (e.g., ones of the tires 106-112) not including accelerometers 304 (e.g., tires without available data).

In the example of FIG. 9, after block 918, control returns to block 912 to again access and process acceleration data to generate another prediction of a tread depth status. In some examples, the on-board diagnostic module 102 will repeat the operation phase 904 from block 912 to generate more tread depth statuses associated with the vehicle 100 after a fixed time interval. In some examples, the on-board diagnostic module 102 will repeat the operation phase 904 from block 912 upon receiving a command. The output handler 816 can additionally provide an estimate of the remaining life of a tire based on the tread depth status. For example, if, during iteration of the operation phase 904, if the tread depth status changes from "good condition" in one iteration to "moderate wear condition" in the next iteration, the output handler 816 can predict the remaining tire life of ones of the tire 200 and can provide the predicted remaining tire life to the display 115.

Now turning to FIG. 10, a flowchart representative of machine readable instructions 1000 which may be executed to implement the example tread depth model controller 104 of FIGS. 1 and/or 6 and the example acceleration data controller 612 of FIGS. 6 and/or 7 to gather and process training data for the example training phase 902 of FIG. 9. The machine readable instructions 1000 begin when the acceleration data controller 612 associated with the tread depth model controller 104 accesses and processes acceleration data 402-406 (FIG. 4) from one or more tires 200 (FIG. 2) of a test vehicle for a test. (Block 1002). An example approach for accessing and processing acceleration data 402-406 is discussed in further detail in connection with FIG. 11. The acceleration data controller 612 can generate the augmented power spectrum density associated with the acceleration data 402-406 for the one or more tires 200 of the test for use as training data for the tread depth status model.

The tread depth determiner 618 (FIG. 6) determines the measured tread depth 318 associated with the one or more tires 200 of the test vehicle for the test and assigns a measured tread depth status (e.g., acceptable tread depth, unacceptable tread depth, moderate wear condition, etc.) to the one or more tires 200 for use in the training data. (Block 1006). In examples disclosed herein, the tread depth status is the labeled output (e.g., the target variable) of the tread depth status model. Accordingly, the measured tread depth status is the component of the training data that is not present in the input data to a deployed tread depth status model. At the conclusion of block 1006, a test is completed for the training data and a data point for the training data has been determined. In some examples, the measured tread depth 318 and/or the measured tread depth status is the same for a plurality of tests, but new first, second, and/or third data segments 408-412, 502-512 are selected for each test of the plurality of tests. In some examples, the test controller 608 can access additional data such as vehicle and tire make, model, tread depth history, vehicle load, vehicle speed, tire pressure, temperature etc., for a test.

The test controller 608 determines whether it is desirable to conduct another test. (Block 1008). For example, the tread depth model controller 104 can conduct a preset number of tests in order to complete the training data. If more tests are desired (e.g., block 1008 returns YES), control returns to block 1002. If more tests are not desired (e.g., block 1010 returns NO), the test controller 608 determines whether application data for previously deployed tread depth status models is available. (Block 1010).

If application data is not available (e.g., block 1010 returns NO), control returns to the machine readable instructions 900 of FIG. 9 where the model generator 624 (FIG. 6) generates a tread depth status model. If application data is available (e.g., block 1010 returns YES), the test controller 608 accesses available application data, include acceleration data (e.g., acceleration data 402-406), tread depth statutes, measured tread depths 318, and/or additional input data collected during an application of a previous tread depth status model with one or more of the on-board diagnostic modules 102. (Block 1012). Control then returns to the machine readable instructions 900 of FIG. 9 where the model generator 624 (FIG. 6) generates a tread depth status model.

Figure 11:
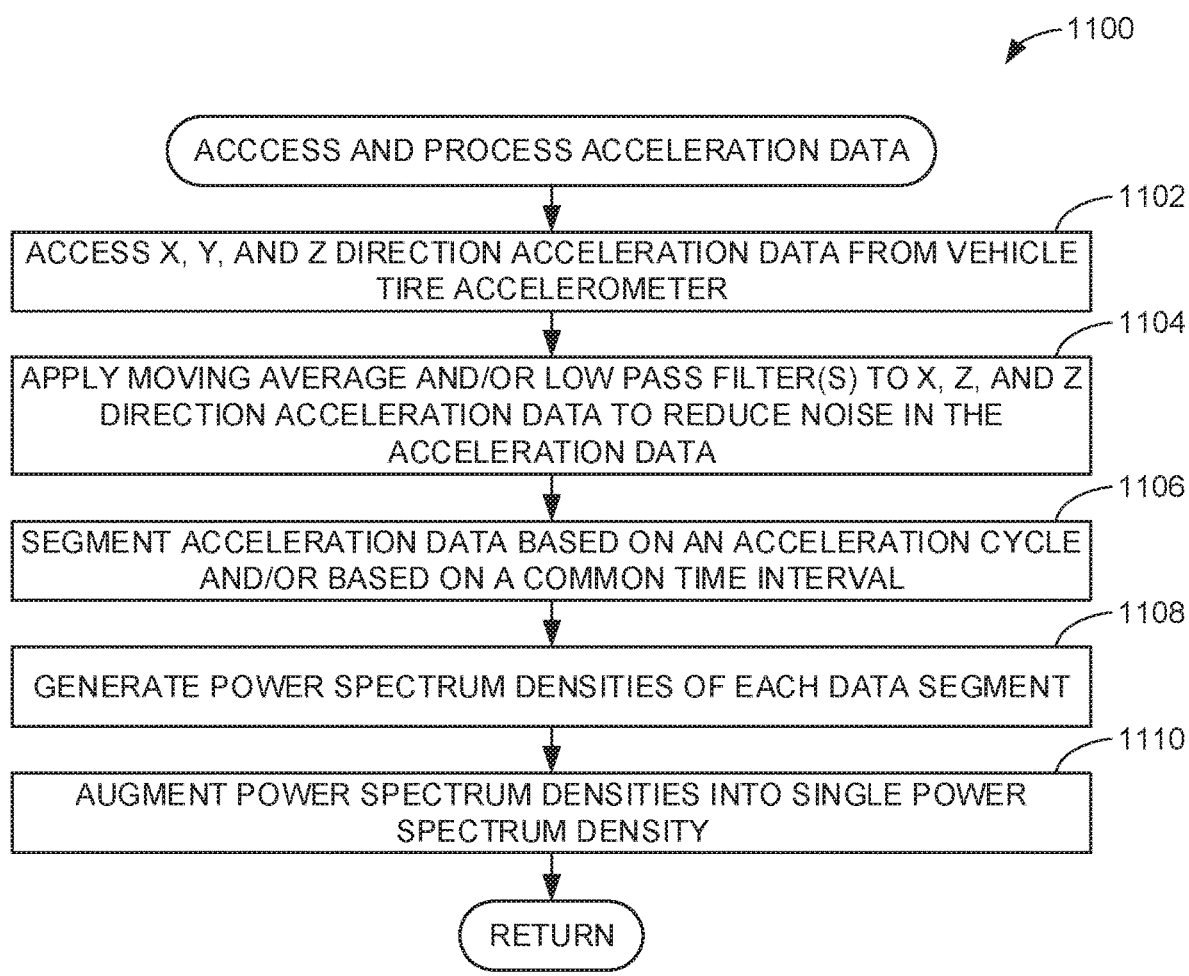
FIG. 11 is a flowchart representative of machine readable instructions which may be executed to implement the example tread depth model controller of FIGS. 1 and/or 6, the example acceleration data controller of FIGS. 6, 7, and/or 8, and/or the example on-board diagnostic module of FIGS. 1 and/or 8 to gather and process acceleration data for the example training phase and/or the example operation phase of FIG. 9.

Now turning to FIG. 11, a flowchart representative of example machine readable instructions 1100 which may be executed to implement the example tread depth model controller 104 of FIGS. 1 and/or 6, the example the acceleration data controller 612 of FIGS. 6, 7, and 8 and/or the example on-board diagnostic module of FIGS. 1 and/or 8 to access and process acceleration data 402-406 of FIG. 4. In the illustrated example of FIG. 11, a first acceleration data controller 612 of the tread depth model controller 104 executes the machine readable instructions 1100 at first instances for one or more tests in connection with block 1002 of FIG. 10 and the training phase 902 of FIG. 9 to access and process acceleration data for a test. In FIG. 11, a second acceleration data controller 612 of the on-board diagnostic module 102 executes the machine readable instructions 1100 at second instances in connection with block 912 of FIG. 9 and the operation phase 904 of FIG. 9 to access and process acceleration data 402-406 to generate a tread depth status.

The machine readable instructions 1100 of FIG. 11 begin when the accelerometer interface 704 of FIG. 7 accesses X direction acceleration data 402, Y direction acceleration data 404, and Z direction acceleration data 406 from the accelerometer 304 (FIG. 3) associated with the tire 200 (FIG. 2). (Block 1102). The accelerometer interface 704 can access the acceleration data 402-406 from the accelerometer 304 (FIG. 3) associated with the tire 200, the acceleration data including first acceleration data indicative of acceleration in a first direction (e.g., X direction acceleration data 402), second acceleration data indicative of acceleration in a second direction (e.g., Y direction acceleration data 404), and third acceleration data indicative of acceleration in a third direction (e.g., Z direction acceleration data 406).

The data smoother 708 of FIG. 7 applies a moving average and/or low pass filter to the acceleration data 402-406 to reduce noise in the acceleration data 402-406. (Block 1104). In some examples, additionally or alternatively, the data smoother 708 can apply any other suitable filtering technique to the acceleration data 402-406. In some examples, additionally or alternatively, the data smoother 708 can apply the moving average filter, the low pass filter, and/or any other suitable filtering technique at another stage of the machine readable instructions 1100, or not apply any filter at all. For example, the data smoother 708 can apply the one or more filters after the acceleration data 402-406 has been segmented into the first, second, and/or third data segments 408-412, 502-512 of FIGS. 4 and/or 5.

The data segmenter 712 of FIG. 7 segments the acceleration data 402-406 based on cycles (e.g., the first data segments 408-412) and/or based on time intervals (e.g., the second data segments 502, 506, 510 and/or the third data segments 504, 508, 512). (Block 1106). For example, the data segmenter 712 can segment the first acceleration data (e.g., the X direction acceleration data 402) into a first data segment (e.g., the first X direction acceleration data segment 408, the second X direction acceleration data segment 502, and/or the third X direction acceleration data segment 504). Similarly, the second acceleration data (e.g., the Y direction acceleration data 404) can be segmented into a second data segment (e.g., the first Y direction acceleration data segment 410, the second Y direction acceleration data segment 506, and/or the third Y direction acceleration data segment 508). Likewise, the third acceleration data (e.g., the Z direction acceleration data 406) can be segmented into a third data segment (e.g., the first Z direction acceleration data segment 412, the second Z direction acceleration data segment 510, and/or the third Z direction acceleration data segment 512) based on at least one of acceleration cycles or a common time interval. The data segmenter 712 can determine a primary cycle peak (e.g., the first peak 426, the second peak 432, and/or the fourth peak 440 of FIG. 4) and set transition points to be halfway between two successive primary cycle peaks in each of the acceleration data 402-406. The data segmenter 712 can segment the acceleration data 402-406 into first data segments 408-412 based on cycles by assigning a beginning time for the data segment at a first transition point and an ending time for the data segment at a second transition point for each cycle.

In the illustrated example of FIG. 7, the data segmenter 712 can be pre-programed and/or preset to, for example, generate data segments based on a common acceleration cycle or based on preset time intervals. In the machine readable instructions 1100, the data segmenter 712 selects a single X direction acceleration data segment, a single Y direction acceleration data segment, and a single Z direction acceleration data segment (e.g., the first data segments 408-412, the second data segments 502, 506, 510, or the third data segments 504, 508, 512) for a test in connection with FIG. 10, and generates a depth status in connection with the operation phase 904 of FIG. 9. Alternatively, the data segmenter 712 can segment acceleration data into other data segments not called out in FIGS. 4 and/or 5 based on an acceleration cycle or another time interval.

The power spectrum generator 716 generates power spectrum densities for each data segment (e.g., the first, second, or third data segments 408-412, 502-512). (Block 1108). In FIG. 7, the power spectrum generator 716 can generate the power spectrum densities based on the illustrated example of Equation (1) below.

$$P = \lim_{T \to \infty} E[|\hat{x}(\omega)|^2] \quad \text{Equation (1)}$$

In the example of Equation (1) above, the function x(ω) represents the data segment (e.g., one data segment of the first, second, or third data segments 408-412, 502-512) expressed in the frequency domain. A vector P represents the power spectrum density of a data segment of the first, second, or third data segments 408-412, 502-512, or the distribution of power among the frequencies of the data segment expressed in the frequency domain. The variable T represents the time interval of the data segment.

In the illustrated example of FIG. 11, the power spectrum generator 716 can generate a power spectrum density for each of a single X direction acceleration data segment, a single Y direction acceleration data segment, and a single Z direction acceleration data segment according to Equation (1). Thus, at block 1108, the power spectrum generator 716 can generate power spectrum densities for the first data segments 408-412, the second data segments 502, 506, 510, or the third data segments 504, 508, 512 according to Equation (1). Alternatively, the power spectrum generator can generate other power spectrum densities for other data segments not called out in FIGS. 4 and/or 5 based on an acceleration cycle or another time interval according to Equation (1).

For example, the power spectrum generator 716 can generate a first power spectrum density associated with the first data segment (e.g., the first X direction acceleration data segment 408, the second X direction acceleration data segment 502, and/or the third X direction acceleration data segment 504), a second power spectrum density associated with the second data segment (e.g., the first Y direction acceleration data segment 410, the second Y direction acceleration data segment 506, and/or the third Y direction acceleration data segment 508), and a third power spectrum density associated with the third data segment (e.g., the first Z direction acceleration data segment 412, the second Z direction acceleration data segment 510, and/or the third Z direction acceleration data segment 512) according to Equation (1).

The data augmenter 720 of FIG. 7 augments the first power spectrum density, the second power spectrum density, and the third power spectrum density into a resultant augmented power spectrum density. (Block 1110). In this example, the augmented power spectrum density (e.g., a fourth power spectrum density, a resultant power spectrum density, a combined power spectrum density, etc.) is a vector and/or matrix containing the power spectrum densities for each of the first, second, and third power spectrum densities. The vector and/or matrix is the independent variable (e.g., the predictor variable) for the tread depth status model.

If the machine readable instructions 1100 are executed in connection with block 1002 of FIG. 10 and the training phase 902 of FIG. 9, control returns to block 1004. If the machine readable instructions 1100 are executed in connection with block 912 of FIG. 9 and the operation phase 904 of FIG. 9, control returns to block 914.

Figure 12:
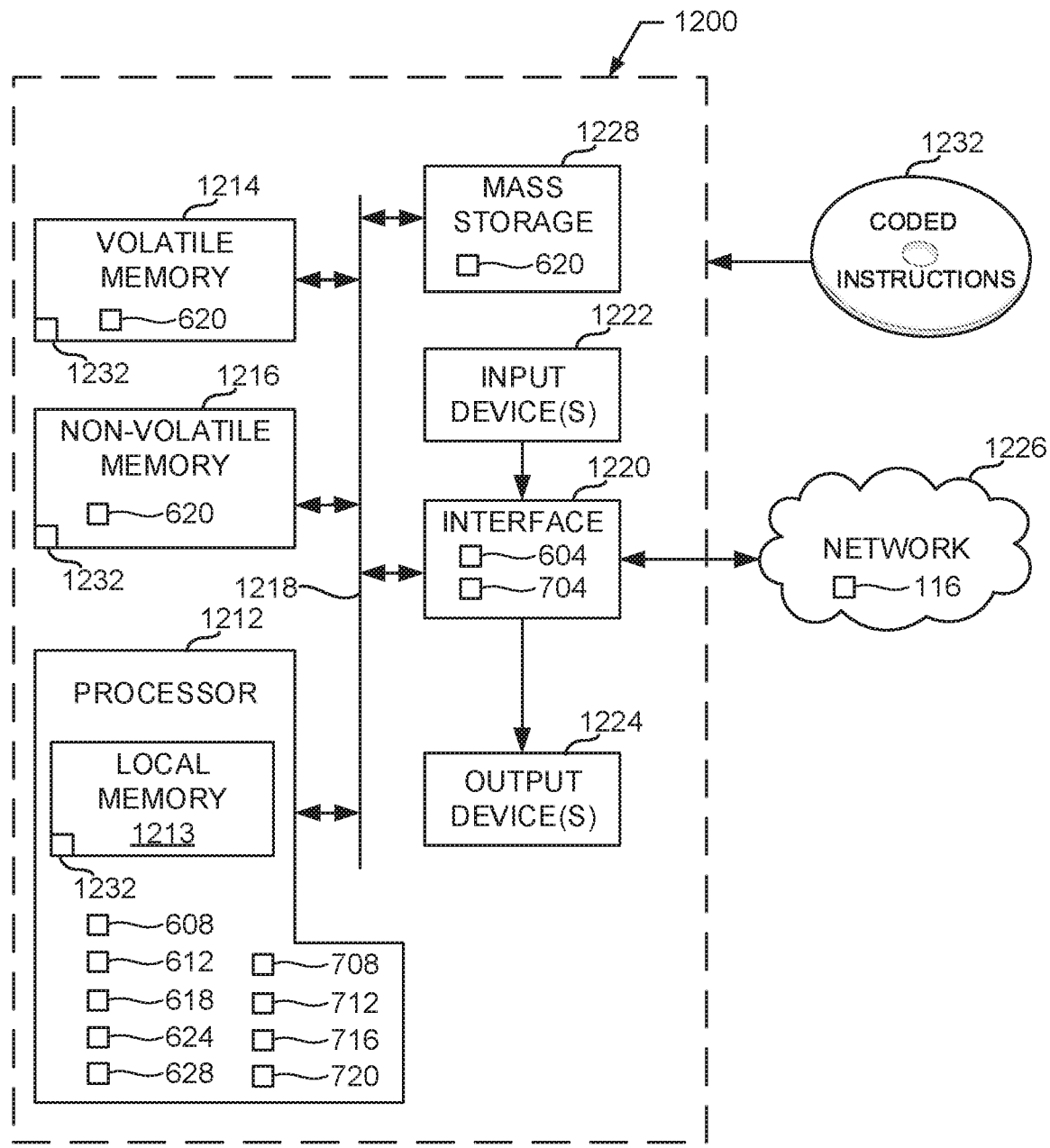
FIG. 12 is a block diagram of an example first processing platform structured to execute the instructions of a training phase of FIG. 9 and/or the instructions of FIGS. 9 and/or 10 to implement the example tread depth model controller of FIGS. 1 and/or 6 and/or the example acceleration data controller of FIGS. 6 and/or 7.

FIG. 12 is a block diagram of an example processor platform 1200 structured to execute the instructions of FIGS. 9, 10, and/or 11 to implement the tread depth model controller 104 of FIGS. 1, 6, and/or 7. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an ECU, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data smoother 708, the example data segmenter 712, the example power spectrum generator 716, the example data augmenter 720 and/or, more generally, the example acceleration data controller 612 of FIGS. 6 and/or 7, the example test controller 608, the example acceleration data controller 612, the example tread depth determiner 618, the example model generator 624, the example model provider 628, and/or, more generally, the example tread depth model controller 104 of FIGS. 1, 6, and/or 7.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a NFC interface, a vehicle bus including a CAN bus, and/or a PCI express interface. In the example of FIG. 12, the example interface circuit 1220 can implement the example first input interfaces 604 and the example accelerometer interface 704.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc. The network 1226 can implement the network 116 of FIGS. 1, 6, and 8.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 9, 10, and/or 11 may be stored in the mass storage device 1228, in the volatile memory 1214, in the non-volatile memory 1216, and/or on a removable non-transitory computer readable storage medium such as a CD or DVD. In the example of FIG. 12, the mass storage device 1228, the volatile memory 1214, the non-volatile memory 1216, and/or the removable non-transitory computer readable storage medium such as a CD or DVD can implement the controller datastore 620 of FIG. 6

Figure 13:
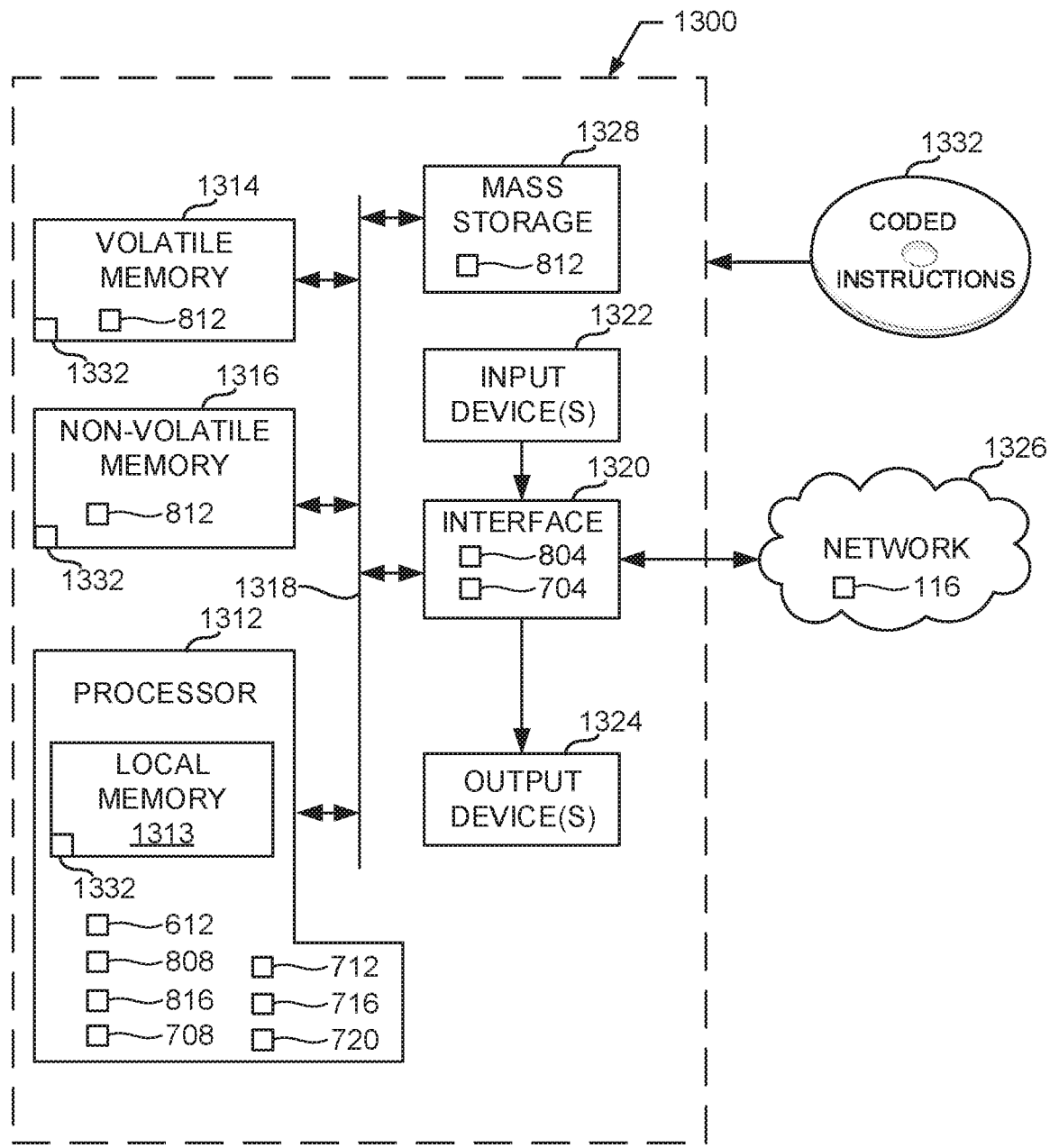
FIG. 13 is a bock diagram of an example second processing platform structured to execute the instructions of an operation phase of FIG. 9 and/or the instructions of FIG. 11 to implement the example acceleration data controller of FIGS. 7 and/or 8 and/or the example on-board diagnostic module of FIGS. 1 and/or 8.

FIG. 13 is a block diagram of an example processor platform 1300 structured to execute the instructions of FIGS. 9 and/or 11 to implement the on-board diagnostic module 102 of FIGS. 1, 7, and/or 8. The processor platform 1300 can be, for example, a server, a personal computer, a workstation, a self-learning machine (e.g., a neural network), a mobile device (e.g., a cell phone, a smart phone, a tablet such as an iPad™), a personal PDA, an Internet appliance, a DVD player, a CD player, a digital video recorder, a Blu-ray player, a gaming console, a personal video recorder, a set top box, a headset or other wearable device, an ECU, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data smoother 708, the example data segmenter 712, the example power spectrum generator 716, the example data augmenter 720 and/or, more generally, the example acceleration data controller 612 of FIGS. 7 and/or 8, the example status controller 808, the example output handler 816, and/or, more generally, the example on-board diagnostic module 102 of FIGS. 1, 7, and/or 8.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by SDRAM, DRAM, RDRAM® and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a (USB, a Bluetooth® interface, a NFC interface, a vehicle bus (e.g., the vehicle bus 114) including a CAN bus and/or a RF module, and/or a PCI express interface. In the example of FIG. 13, the example interface circuit 1320 can implement the example second input interfaces 804 and the example accelerometer interface 704.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., LED, an OLED, a LCD, a CRT, an IPS display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a (DSL) connection, a telephone line connection, a coaxial cable system, a satellite system, a line-of-site wireless system, a cellular telephone system, etc. The network 1326 also can implement the network 116 of FIGS. 1, 6, and 8.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives.

The machine executable instructions 1332 of FIGS. 9 and/or 11 may be stored in the mass storage device 1328, in the volatile memory 1314, in the non-volatile memory 1316, and/or on a removable non-transitory computer readable storage medium such as a CD or DVD. In the example of FIG. 13, the mass storage device 1328, the volatile memory 1314, the non-volatile memory 1316, and/or the removable non-transitory computer readable storage medium such as a CD or DVD can implement the local datastore 812 of FIG. 8.

From the foregoing, it will be appreciated that example methods, apparatus and articles of manufacture have been disclosed that can train a tread depth status model and implement the tread depth status model to determine a likely tread depth and/or a likely tread depth status associated with one or more tires of a vehicle such as the vehicle 100. The disclosed methods, apparatus and articles of manufacture improve the efficiency of using a computing device by using measured tread depths and/or measured tread depth statuses and acceleration data of a vehicle to train and deploy a tread depth status model to determine a tread depths and/or tread depth statuses associated with one or more tires of a vehicle. The disclosed methods, apparatus and articles of manufacture are accordingly directed to one or more improvement(s) in the functioning of a computer.

Example 1 includes an apparatus for determining a tread depth status of a tire of a vehicle, the apparatus comprising an accelerometer interface to access acceleration data from an accelerometer associated with the tire, the acceleration data including first acceleration data indicative of acceleration in a first direction, second acceleration data indicative of acceleration in a second direction, and third acceleration data indicative of acceleration in a third direction, a data segmenter to segment the first acceleration data into a first data segment, the second acceleration data into a second data segment, and the third acceleration data into a third data segment based on at least one of an acceleration cycle or a common time interval, a power spectrum generator to generate a first power spectrum density associated with the first data segment, a second power spectrum density associated with the second data segment, and a third power spectrum density associated with the third data segment, a data augmenter to augment the first, second, and third power spectrum densities into a fourth power spectrum density, and a status controller to determine the tread depth status based on the fourth power spectrum density.

Example 2 includes the apparatus of example 1, further including an output handler to provide the tread depth status to a display of the vehicle.

Example 3 includes the apparatus of example 1, wherein the data segmenter is to segment the first, second, and third acceleration data into first, second, and third data segments based on the acceleration cycle, the acceleration cycle associated with a revolution of the tire including a contact event of the accelerometer.

Example 4 includes the apparatus of example 3, wherein the acceleration cycle is an aggregation based on two or more acceleration cycles.

Example 5 includes the apparatus of example 1, wherein the accelerometer interface, the data segmenter, the data augmenter, the power spectrum generator, and the status controller are implemented by an electronic control unit of the vehicle.

Example 6 includes the apparatus of example 1, wherein the tread depth status is indicative that a tread depth of the tire is above or below a threshold.

Example 7 includes the apparatus of example 1, wherein the tread depth status is indicative that a tread depth of the tire is within a range of tread depths.

Example 8 includes a method for determining a tread depth status of a tire of a vehicle, the method comprising accessing acceleration data from an accelerometer associated with the tire, the acceleration data including first acceleration data indicative of acceleration in a first direction, second acceleration data indicative of acceleration in a second direction, and third acceleration data indicative of acceleration in a third direction, segmenting the first acceleration data into a first data segment, the second acceleration data into a second data segment, and the third acceleration data into a third data segment based on at least one of an acceleration cycle or a common time interval, generating a first statistic associated with the first data segment, a second statistic associated with the second data segment, and a third statistic value associated with the third data segment, augmenting the first statistic, second statistic, and third statistic into a fourth statistic, determining the tread depth status based on the fourth statistic.

Example 9 includes the method of example 8, further including providing the tread depth status to a display of a vehicle.

Example 10 includes the method of example 8, wherein segmenting the first, second, and third acceleration data into first, second, and third data segments is based on the acceleration cycle, the acceleration cycle associated with a contact event of the accelerometer.

Example 11 includes the method of example 10, wherein the acceleration cycle is based on an aggregation of two or more acceleration cycles.

Example 12 includes the method of example 8, wherein determining the tread depth status is at least partially achieved by an electronic control unit of the vehicle.

Example 13 includes the method of example 8, wherein the tread depth status is indicative that a tread depth of the tire is above or below a threshold.

Example 14 includes the method of example 8, wherein the tread depth status is indicative that a tread depth of the tire is within a range of tread depths.

Example 15 includes the method of example 8, wherein the fourth statistic is a power spectrum density.

Example 16 includes an electronic control unit (ECU) for determining a tread depth of a tire of a vehicle, the ECU comprising an input interface to access acceleration data from an accelerometer associated with the tire, the acceleration data including first acceleration data indicative of acceleration in a first direction, second acceleration data indicative of acceleration in a second direction, and third acceleration data indicative of acceleration data in a third direction, a data segmenter to segment at least the first acceleration data into a first data segment, the second acceleration data into a second data segment, and the third acceleration data into a third data segment based on at least one of an acceleration cycle or a common time interval, a power spectrum generator to generate a first power spectrum density associated with the first data segment, a second power spectrum density associated with the second data segment, and a third power spectrum density associated with the third data segment, a data augmenter to augment the first, second, and third power spectrum densities into a fourth power spectrum density, and a status controller to determine the tread depth based on the fourth power spectrum density.

Example 17 includes the ECU of example 16, wherein the tread depth is indicative of a numerical tread depth of the tire.

Example 18 includes the ECU of example 17, further including an output handler to provide at least one of the tread depth or a tread depth status to a display of a vehicle.

Example 19 includes the ECU of example 16, wherein the fourth power spectrum density is a matrix including the first, second, and third power spectrum densities.

Example 20 includes the ECU of example 16, wherein the status controller is to determine the tread depth based on a regression.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for determining a tread depth status of a tire of a vehicle, the apparatus comprising:
    an accelerometer interface to access acceleration data from an accelerometer associated with the tire, the acceleration data including first acceleration data indicative of acceleration in a first direction, second acceleration data indicative of acceleration in a second direction, and third acceleration data indicative of acceleration in a third direction;
    a data segmenter to segment the first acceleration data into a first data segment, the second acceleration data into a second data segment, and the third acceleration data into a third data segment based on at least one of an acceleration cycle or a common time interval;
    a power spectrum generator to generate a first power spectrum density associated with the first data segment, a second power spectrum density associated with the second data segment, and a third power spectrum density associated with the third data segment;
    a data augmenter to augment the first, second, and third power spectrum densities into a fourth power spectrum density; and
    a status controller to determine the tread depth status based on the fourth power spectrum density.

2. The apparatus of claim 1, further including an output handler to provide the tread depth status to a display of the vehicle.

3. The apparatus of claim 1, wherein the data segmenter is to segment the first, second, and third acceleration data into first, second, and third data segments based on the acceleration cycle, the acceleration cycle associated with a revolution of the tire including a contact event of the accelerometer.

4. The apparatus of claim 3, wherein the acceleration cycle is an aggregation based on two or more acceleration cycles.

5. The apparatus of claim 1, wherein the accelerometer interface, the data segmenter, the data augmenter, the power spectrum generator, and the status controller are implemented by an electronic control unit of the vehicle.

6. The apparatus of claim 1, wherein the tread depth status is indicative that a tread depth of the tire is above or below a threshold.

7. The apparatus of claim 1, wherein the tread depth status is indicative that a tread depth of the tire is within a range of tread depths.

8. A method for determining a tread depth status of a tire of a vehicle, the method comprising:
    accessing acceleration data from an accelerometer associated with the tire, the acceleration data including first acceleration data indicative of acceleration in a first direction, second acceleration data indicative of acceleration in a second direction, and third acceleration data indicative of acceleration in a third direction;
    segmenting the first acceleration data into a first data segment, the second acceleration data into a second data segment, and the third acceleration data into a third data segment based on at least one of an acceleration cycle or a common time interval;
    generating a first statistic associated with the first data segment, a second statistic associated with the second data segment, and a third statistic value associated with the third data segment;
    augmenting the first statistic, second statistic, and third statistic into a fourth statistic;
    determining the tread depth status based on the fourth statistic.

9. The method of claim 8, further including providing the tread depth status to a display of a vehicle.

10. The method of claim 8, wherein segmenting the first, second, and third acceleration data into first, second, and third data segments is based on the acceleration cycle, the acceleration cycle associated with a contact event of the accelerometer.

11. The method of claim 10, wherein the acceleration cycle is based on an aggregation of two or more acceleration cycles.

12. The method of claim 8, wherein determining the tread depth status is at least partially achieved by an electronic control unit of the vehicle.

13. The method of claim 8, wherein the tread depth status is indicative that a tread depth of the tire is above or below a threshold.

14. The method of claim 8, wherein the tread depth status is indicative that a tread depth of the tire is within a range of tread depths.

15. The method of claim 8, wherein the fourth statistic is a power spectrum density.

16. An electronic control unit (ECU) for determining a tread depth of a tire of a vehicle, the ECU comprising:
    an input interface to access acceleration data from an accelerometer associated with the tire, the acceleration data including first acceleration data indicative of acceleration in a first direction, second acceleration data indicative of acceleration in a second direction, and third acceleration data indicative of acceleration data in a third direction;
    a data segmenter to segment at least the first acceleration data into a first data segment, the second acceleration data into a second data segment, and the third acceleration data into a third data segment based on at least one of an acceleration cycle or a common time interval;
    a power spectrum generator to generate a first power spectrum density associated with the first data segment, a second power spectrum density associated with the second data segment, and a third power spectrum density associated with the third data segment;

a data augmenter to augment the first, second, and third power spectrum densities into a fourth power spectrum density; and a status controller to determine the tread depth based on the fourth power spectrum density.

17. The ECU of claim 16, wherein the tread depth is indicative of a numerical tread depth of the tire.

18. The ECU of claim 17, further including an output handler to provide at least one of the tread depth or a tread depth status to a display of a vehicle.

19. The ECU of claim 16, wherein the fourth power spectrum density is a matrix including the first, second, and third power spectrum densities.

20. The ECU of claim 16, wherein the status controller is to determine the tread depth based on a regression.

* * * * *

UNITED STATES PATENT AND TRADEMARK OFFICE
CERTIFICATE OF CORRECTION

PATENT NO. : 11,458,784 B2
APPLICATION NO. : 16/829867
DATED : October 4, 2022
INVENTOR(S) : Tang et al.

Page 1 of 1

It is certified that error appears in the above-identified patent and that said Letters Patent is hereby corrected as shown below:

In the Drawings

In Field "720", under "FIG.7", delete "DATA AUGMETNER" and insert -- DATA AUGMENTER --, In Field "1100", under "FIG.11", delete "ACCCESS" and insert -- ACCESS --.

Signed and Sealed this
Thirty-first Day of January, 2023

Katherine Kelly Vidal
*Director of the United States Patent and Trademark Office*